US009680219B2

(12) United States Patent
Filipovic et al.

(10) Patent No.: US 9,680,219 B2
(45) Date of Patent: Jun. 13, 2017

(54) ANTENNA SWITCHING DEVICES, SYSTEMS, AND METHODS

(71) Applicant: QUALCOMM Incorporated, San Diego, CA (US)

(72) Inventors: Daniel Fred Filipovic, Solana Beach, CA (US); Hongbo Yan, Vista, CA (US); Ning He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/838,674

(22) Filed: Mar. 15, 2013

(65) Prior Publication Data

US 2013/0310109 A1  Nov. 21, 2013

Related U.S. Application Data

(60) Provisional application No. 61/649,704, filed on May 21, 2012, provisional application No. 61/716,582, (Continued)

(51) Int. Cl.
*H01Q 3/24* (2006.01)
*H04W 24/02* (2009.01)
(Continued)

(52) U.S. Cl.
CPC .............. *H01Q 3/24* (2013.01); *H04B 1/44* (2013.01); *H04B 7/0404* (2013.01);
(Continued)

(58) Field of Classification Search
USPC ........ 455/277.2, 41.2, 500, 522, 574, 575.7, 455/562.1; 375/267, 347; 370/252, 329,
(Continued)

(56) References Cited

U.S. PATENT DOCUMENTS 5,481,571 A    1/1996  Balachandran et al.
5,530,926 A *  6/1996  Rozanski .................. H04L 1/06
                                                  370/342

(Continued)

FOREIGN PATENT DOCUMENTS

CN         1764076 A     4/2006
CN      101562459 A    10/2009
(Continued)

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005 (Aug. 1, 2005), pp. 3042-3056, XP011136488, ISSN: 1053-587X, DOI: DOI:10.1109/TSP.2005. 851109.

(Continued)

*Primary Examiner* — Junpeng Chen
(74) *Attorney, Agent, or Firm* — Larry J. Moskowitz

(57) ABSTRACT

This disclosure provides systems, methods, and apparatus for antenna switching. In one embodiment, a wireless communication apparatus is provided. The wireless communication apparatus includes a plurality of antennas including a first antenna and a second antenna. The wireless communication apparatus further includes at least one receive circuit including a first receive circuit. The wireless communication apparatus further includes a controller configured to selectively switch the first receive circuit from receiving wireless communications via the first antenna to receive wireless communications via the second antenna if one or more performance characteristics of the first antenna are below a threshold in one or more measurement cycles, the one or more measurement cycles including a wake-up cycle outside (Continued)

of a predetermined wake-up cycle. Other aspects, embodiments, and features are also claimed and described.

36 Claims, 12 Drawing Sheets

Related U.S. Application Data filed on Oct. 21, 2012, provisional application No. 61/734,276, filed on Dec. 6, 2012, provisional application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.

| | | |
|---|---|---|
| H04B 7/0404 | (2017.01) | |
| H04W 72/08 | (2009.01) | |
| H04W 76/02 | (2009.01) | |
| H04W 36/30 | (2009.01) | |
| H04B 1/44 | (2006.01) | |
| H04W 36/14 | (2009.01) | |
| H04W 88/06 | (2009.01) | |
| H04B 7/06 | (2006.01) | |
| H04B 7/08 | (2006.01) | |

(52) U.S. Cl.
CPC ......... *H04B 7/0602* (2013.01); *H04B 7/0608* (2013.01); *H04B 7/0802* (2013.01); *H04B 7/0814* (2013.01); *H04W 24/02* (2013.01); *H04W 36/14* (2013.01); *H04W 36/30* (2013.01); *H04W 72/085* (2013.01); *H04W 76/027* (2013.01); *H04W 88/06* (2013.01)

(58) Field of Classification Search
USPC ........................................................ 370/334
See application file for complete search history.

(56) References Cited

U.S. PATENT DOCUMENTS

| | | | |
|---|---|---|---|
| 5,541,963 | A | 7/1996 | Nakagoshi |
| 5,940,454 | A | 8/1999 | McNicol et al. |
| 6,029,057 | A | 2/2000 | Paatelma et al. |
| 6,032,033 | A | 2/2000 | Morris et al. |
| 6,035,183 | A | 3/2000 | Todd et al. |
| 6,360,088 | B1 | 3/2002 | Shi et al. |
| 6,594,475 | B1 | 7/2003 | Anvekar et al. |
| 6,947,716 | B2 | 9/2005 | Ono |
| 6,961,545 | B2 | 11/2005 | Tehrani et al. |
| 7,295,528 | B2 | 11/2007 | Ibrahim et al. |
| 7,447,171 | B2 | 11/2008 | Smallcomb et al. |
| 7,471,702 | B2 | 12/2008 | Laroia et al. |
| 7,492,842 | B2 | 2/2009 | Yen et al. |
| 7,499,691 | B1 | 3/2009 | Dunn et al. |
| 7,502,592 | B2 | 3/2009 | Yamamoto et al. |
| 7,546,404 | B2 | 6/2009 | Yeh et al. |
| 7,907,573 | B2 | 3/2011 | Lee et al. |
| 7,991,429 | B2 | 8/2011 | Chiu |
| 8,009,096 | B2 | 8/2011 | Harel et al. |
| 8,014,817 | B2 | 9/2011 | Suzuki et al. |
| 8,036,710 | B2 | 10/2011 | Walton et al. |
| 8,085,734 | B2 | 12/2011 | Faber |
| 8,144,821 | B2 | 3/2012 | Hutchison et al. |
| 8,159,399 | B2 | 4/2012 | Dorsey et al. |
| 8,213,344 | B2 | 7/2012 | Zhu et al. |
| 8,244,944 | B1 | 8/2012 | Wong et al. |
| 8,301,192 | B2 | 10/2012 | Kakitsu et al. |
| 8,340,714 | B2 | 12/2012 | Hassan et al. |
| 8,417,205 | B2 | 4/2013 | Tang et al. |
| 8,463,214 | B2 | 6/2013 | Yen et al. |
| 8,600,427 | B2 | 12/2013 | Ibrahim et al. |
| 8,615,270 | B2 | 12/2013 | Ibrahim et al. |
| 8,755,359 | B2 | 6/2014 | Faber |
| 8,831,532 | B2 | 9/2014 | Nukala et al. |
| 2002/0086648 | A1 | 7/2002 | Wilhelmsson et al. |
| 2002/0118724 | A1 | 8/2002 | Kishimoto et al. |
| 2002/0126640 | A1 | 9/2002 | Komatsu |
| 2003/0157954 | A1 | 8/2003 | Medvedev et al. |
| 2004/0029619 | A1 | 2/2004 | Liang et al. |
| 2004/0229650 | A1 | 11/2004 | Fitton et al. |
| 2004/0242277 | A1 | 12/2004 | Kiribayashi |
| 2005/0059431 | A1 | 3/2005 | Matsui et al. |
| 2005/0101252 | A1 | 5/2005 | Carvalho et al. |
| 2005/0113038 | A1 | 5/2005 | Kasami et al. |
| 2005/0113039 | A1 | 5/2005 | Tsukamoto |
| 2005/0266903 | A1 | 12/2005 | Masaki |
| 2006/0025090 | A1 | 2/2006 | Shirakata et al. |
| 2006/0073829 | A1 | 4/2006 | Cho et al. |
| 2006/0133544 | A1 | 6/2006 | Kawada et al. |
| 2006/0234776 | A1 | 10/2006 | Ishihara et al. |
| 2006/0252383 | A1 | 11/2006 | Forrester et al. |
| 2006/0276132 | A1 | 12/2006 | Sheng-Fuh et al. |
| 2007/0032255 | A1 | 2/2007 | Koo et al. |
| 2007/0066244 | A1 | 3/2007 | Kao et al. |
| 2007/0066361 | A1 | 3/2007 | Knudsen et al. |
| 2007/0093282 | A1 | 4/2007 | Chang et al. |
| 2007/0178839 | A1 | 8/2007 | Rezvani et al. |
| 2007/0238496 | A1 | 10/2007 | Chung et al. |
| 2007/0285326 | A1 | 12/2007 | McKinzie et al. |
| 2008/0043671 | A1 | 2/2008 | Moon et al. |
| 2008/0102760 | A1 | 5/2008 | McConnell et al. |
| 2008/0123610 | A1 | 5/2008 | Desai et al. |
| 2008/0240280 | A1 | 10/2008 | Li |
| 2008/0311871 | A1 | 12/2008 | Qi et al. |
| 2008/0316913 | A1 | 12/2008 | Kim et al. |
| 2009/0124290 | A1 | 5/2009 | Tao et al. |
| 2009/0137206 | A1 | 5/2009 | Sherman et al. |
| 2009/0180451 | A1 | 7/2009 | Alpert et al. |
| 2009/0258622 | A1 | 10/2009 | Ruijter |
| 2009/0258627 | A1 | 10/2009 | Hanusch et al. |
| 2010/0022192 | A1 | 1/2010 | Knudsen et al. |
| 2010/0041355 | A1 | 2/2010 | Laroia et al. |
| 2010/0054210 | A1 | 3/2010 | Ostergren |
| 2010/0120466 | A1 | 5/2010 | Li |
| 2010/0172426 | A1 | 7/2010 | Chang |
| 2010/0184459 | A1 | 7/2010 | Mori |
| 2010/0215111 | A1 | 8/2010 | Filipovic et al. |
| 2010/0231473 | A1 | 9/2010 | Shtrom et al. |
| 2010/0232533 | A1 | 9/2010 | Lee et al. |
| 2010/0246725 | A1 | 9/2010 | Okuyama et al. |
| 2010/0296419 | A1 | 11/2010 | Kim et al. |
| 2011/0103442 | A1 | 5/2011 | Nakayauchi et al. |
| 2011/0164595 | A1* | 7/2011 | So .................. H04W 12/06 370/338 |
| 2011/0250926 | A1 | 10/2011 | Wietfeldt et al. |
| 2011/0292786 | A1 | 12/2011 | Haessler et al. |
| 2011/0311001 | A1 | 12/2011 | Lindenbauer et al. |
| 2012/0008510 | A1 | 1/2012 | Cai et al. |
| 2012/0027112 | A1 | 2/2012 | Jiang et al. |
| 2012/0115553 | A1 | 5/2012 | Mahe et al. |
| 2012/0142291 | A1 | 6/2012 | Rath et al. |
| 2012/0184327 | A1 | 7/2012 | Love et al. |
| 2012/0195224 | A1 | 8/2012 | Kazmi et al. |
| 2012/0202555 | A1 | 8/2012 | Bergman et al. |
| 2012/0207045 | A1 | 8/2012 | Pelletier et al. |
| 2012/0244895 | A1 | 9/2012 | Thomas et al. |
| 2012/0281553 | A1 | 11/2012 | Mujtaba et al. |
| 2012/0282982 | A1* | 11/2012 | Mujtaba ............ H04W 52/0245 455/574 |
| 2012/0320803 | A1 | 12/2012 | Skarp |
| 2012/0328057 | A1 | 12/2012 | Kroeger et al. |
| 2013/0005278 | A1 | 1/2013 | Black et al. |
| 2013/0017797 | A1 | 1/2013 | Ramasamy et al. |
| 2013/0023265 | A1 | 1/2013 | Swaminathan et al. |
| 2013/0033996 | A1 | 2/2013 | Song et al. |
| 2013/0035051 | A1 | 2/2013 | Mujtaba et al. |
| 2013/0040671 | A1 | 2/2013 | Zawaideh et al. |

(56) References Cited

U.S. PATENT DOCUMENTS

| | | |
|---|---|---|
| 2013/0084807 A1 | 4/2013 | Nukala et al. |
| 2013/0156080 A1 | 6/2013 | Cheng et al. |
| 2013/0217450 A1 | 8/2013 | Kanj et al. |
| 2013/0267181 A1 | 10/2013 | Ayatollahi et al. |
| 2013/0307727 A1 | 11/2013 | He et al. |
| 2013/0308476 A1 | 11/2013 | He et al. |
| 2013/0308477 A1 | 11/2013 | He et al. |
| 2013/0308478 A1 | 11/2013 | He et al. |
| 2013/0308554 A1 | 11/2013 | Ngai et al. |
| 2013/0308561 A1 | 11/2013 | He et al. |
| 2013/0308562 A1 | 11/2013 | Matin et al. |
| 2013/0308608 A1 | 11/2013 | Hu et al. |
| 2013/0309981 A1 | 11/2013 | Ngai et al. |
| 2013/0309982 A1 | 11/2013 | Yan et al. |
| 2013/0310045 A1 | 11/2013 | Yan et al. |
| 2014/0105204 A1 | 4/2014 | Bengtsson |

FOREIGN PATENT DOCUMENTS

| | | |
|---|---|---|
| CN | 100578962 C | 1/2010 |
| EP | 746118 A1 | 12/1996 |
| EP | 1175021 A2 | 1/2002 |
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |
| WO | WO-0241517 A2 | 5/2002 |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | WO-2011084717 A1 | 7/2011 |
| WO | 2012011077 A1 | 1/2012 |

OTHER PUBLICATIONS

Chapter II Demand & Response Under PCT Article 34—The International Preliminary Examining Authority; Feb. 28, 2014; (PCT/US2013/041883).

International Search Report and Written Opinion—PCT/US2013/041883—ISA/EPO—Nov. 22, 2013.

Chapter II Demand and Article 34 Amendments with Response to Written Opinion; International Searching Authority, Jan. 3, 2014, PCT/US2013/041895, 29 pages.

* cited by examiner

ANTENNA SWITCHING DEVICES, SYSTEMS, AND METHODS

CROSS REFERENCE TO RELATED APPLICATIONS

The present application for patent claims priority to and the benefit of U.S. Provisional Application Nos.: (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically to antenna selection in a wireless communication apparatus.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may support communications using multiple radio access technologies. Different radio access technologies may be used to expand the scope of services offered by the communications as a mobile device moves through different regions supporting different radio access technologies. Furthermore, different radio access technologies may be used to allow a user to engage in a variety of different forms of wireless communication activities.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One embodiment of the subject matter described in the disclosure provides a wireless communication apparatus. The wireless communication apparatus includes a plurality of antennas including a first antenna and a second antenna. The wireless communication apparatus further includes at least one receive circuit including a first receive circuit. The wireless communication apparatus further includes a controller configured to selectively switch the first receive circuit from receiving wireless communications via the first antenna to receive wireless communications via the second antenna if one or more performance characteristics of the first antenna are below a threshold in one or more measurement cycles, the one or more measurement cycles including a wake-up cycle outside of a predetermined wake-up cycle.

Another aspect of the subject matter described in the disclosure provides an implementation of a method implemented in a wireless communication apparatus. The method includes receiving wireless communications at a first receive circuit via a first antenna and selectively switching the first receive circuit from receiving wireless communications via the first antenna to receive wireless communications via a second antenna if one or more performance characteristics of the first antenna are below a threshold in one or more measurement cycles, the one or more measurement cycles including a wake-up cycle outside of a predetermined wake-up cycle.

Yet another aspect of the subject matter described in the disclosure provides a wireless communication apparatus. The wireless communication apparatus includes a plurality of antennas including a first antenna and a second antenna. The wireless communication apparatus further includes at least one receive circuit including a first receive circuit. The wireless communication apparatus further includes means for selectively switching the first receive circuit from receiving wireless communications via the first antenna to receive wireless communications via the second antenna if one or more performance characteristics of the first antenna are below a threshold in one or more measurement cycles, the one or more measurement cycles including a wake-up cycle outside of a predetermined wake-up cycle.

Another aspect of the subject matter described in the disclosure provides a computer program product. The computer program product includes a computer readable medium. The computer readable medium includes code, when executed by a computer, causing the computer to receive wireless communications at a first receive circuit via a first antenna. The computer readable medium further includes code, when executed by a computer, causing the computer to selectively switch the first receive circuit from receiving wireless communications via the first antenna to receive wireless communications via a second antenna if one or more performance characteristics of the first antenna are below a threshold in one or more measurement cycles, the one or more measurement cycles including a wake-up cycle outside of a predetermined wake-up cycle.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
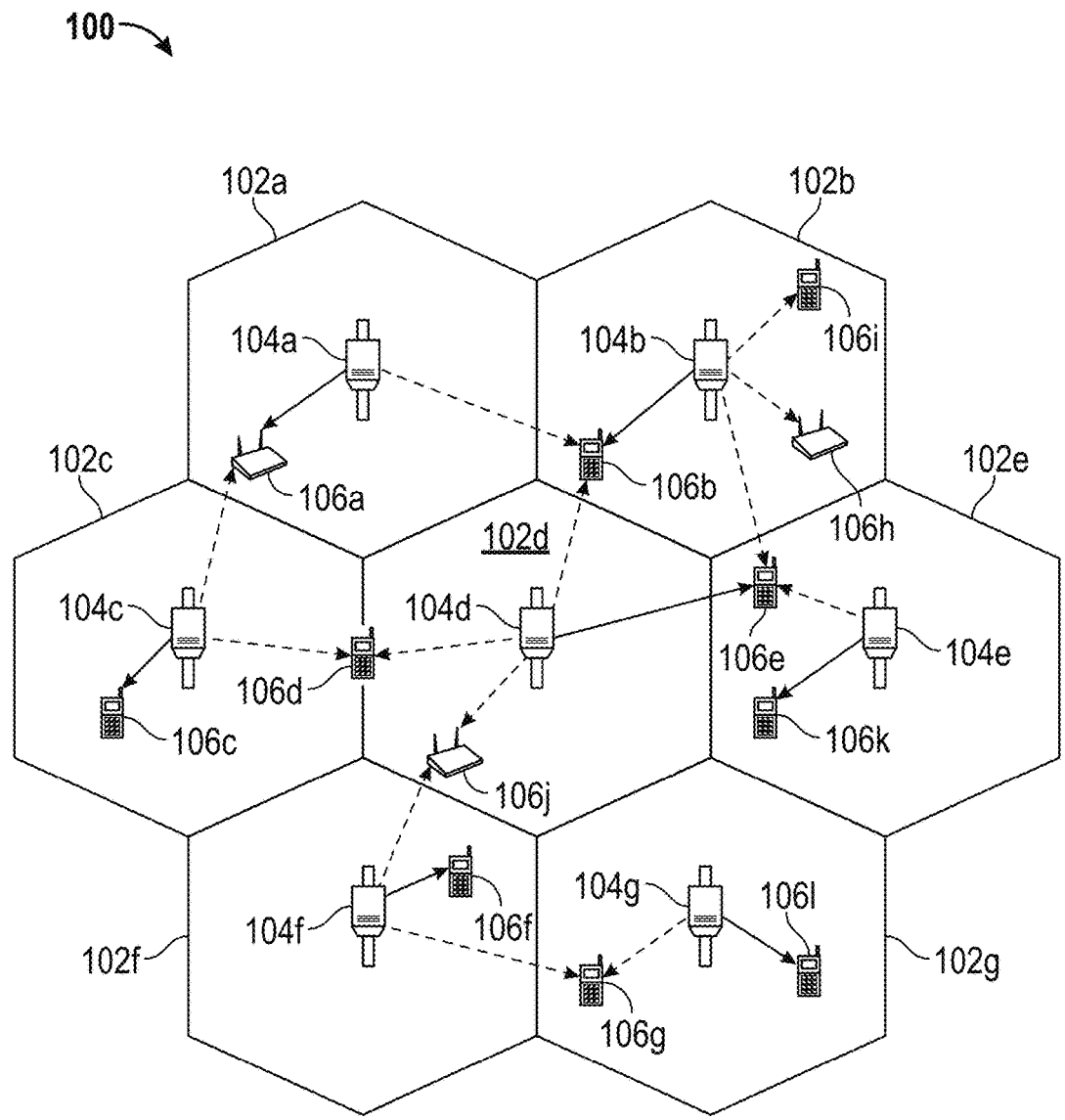
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects or embodiments set forth herein. In addition, such an apparatus may be implemented and/or such a method may be practiced using other structure and/or functionality in addition to or other than one or more of the aspects or embodiments set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and the like. The terms "networks" and "systems" are often used interchangeably. A CDMA network may implement a radio technology such as Universal Terrestrial Radio Access (UTRA), cdma2000, and the like. UTRA includes Wideband-CDMA (W-CDMA) and Low Chip Rate (LCR). A cdma2000 network may include IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). The cdma2000 and EV-DO standards are described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA may be useful especially for use in uplink communications where lower PAPR greatly benefits the mobile terminal in terms of transmit power efficiency. For example, SC-FDMA has been adopted as an option for the uplink multiple access method in LTE networks.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations, access points, and the like), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, each of the ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device or apparatus (e.g., a mobile phone, router, personal computer, server, etc.) used by a user to send and receive voice or data communications over a communications network. An AT 106 may also be referred to herein as user equipment (UE), mobile station (MS), or a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs). For example, AT 106 may be capable of operating using one or more RATs defined by standards such as wideband code division multiple access (WCDMA), cdma2000 1x, 1x-EV-DO, LTE, eHRPD, 802.11, and the like. An AT 106 may perform a plurality of tasks across various communication systems using these different RATs. The communication may be accomplished using a plurality of collocated transmitters and/or receivers, or may be communicated using one single transmitter and/or receiver.

Figure 2:
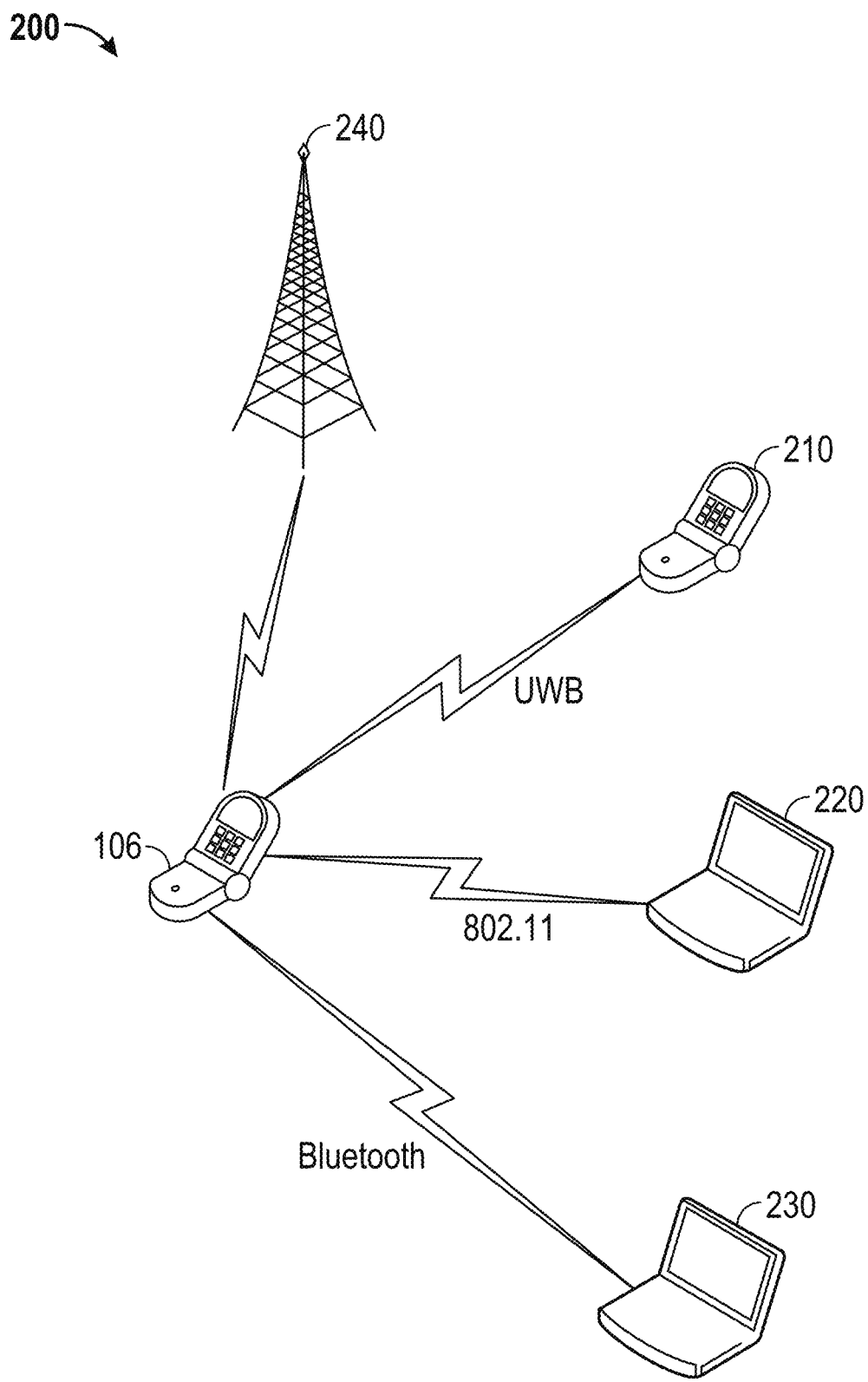
FIG. 2 shows an example of a functional block diagram of an exemplary mobile device operating in a wireless communication network in accordance with some embodiments.

FIG. 2 shows an example of a functional block diagram of an exemplary access terminal (AT) 106 operating in a wireless communication network 200 in accordance with some embodiments. The wireless communication network 200 comprises the AT 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. The AT 106 may be simultaneously in communication with each of devices 210, 220, 230, and 240 via one or more transmitters and/or receivers collocated on access terminal 106.

With continuing reference to FIG. 2, the AT 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n, etc.), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, such as a home, office, a group of buildings, or the like. A WLAN may use standards, such as an 802.11 standard and/or other standards, for wireless communications. In some embodiments, a WLAN may use peer-to-peer communication in which the wireless communication devices directly communicate with each other.

The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices directly communicate with each other.

The wireless communications network 200 may also comprise a wide wireless area network (WWAN). The WWAN may use standards such as WCDMA, cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of access terminal 106, as described in greater detail below.

Although the following embodiments may refer to FIG. 1 or 2, one will recognize that they are readily applicable to other communication standards. For example, some embodiments may be applicable in a UMTS communication system. Some embodiments may be applicable in an OFDMA communication system. The communication system 200 may further comprise any type of communication system including, but not limited to, a CDMA system, a GSM system, a wideband code division multiple access (WCDMA), and an OFDM system.

Figure 3:
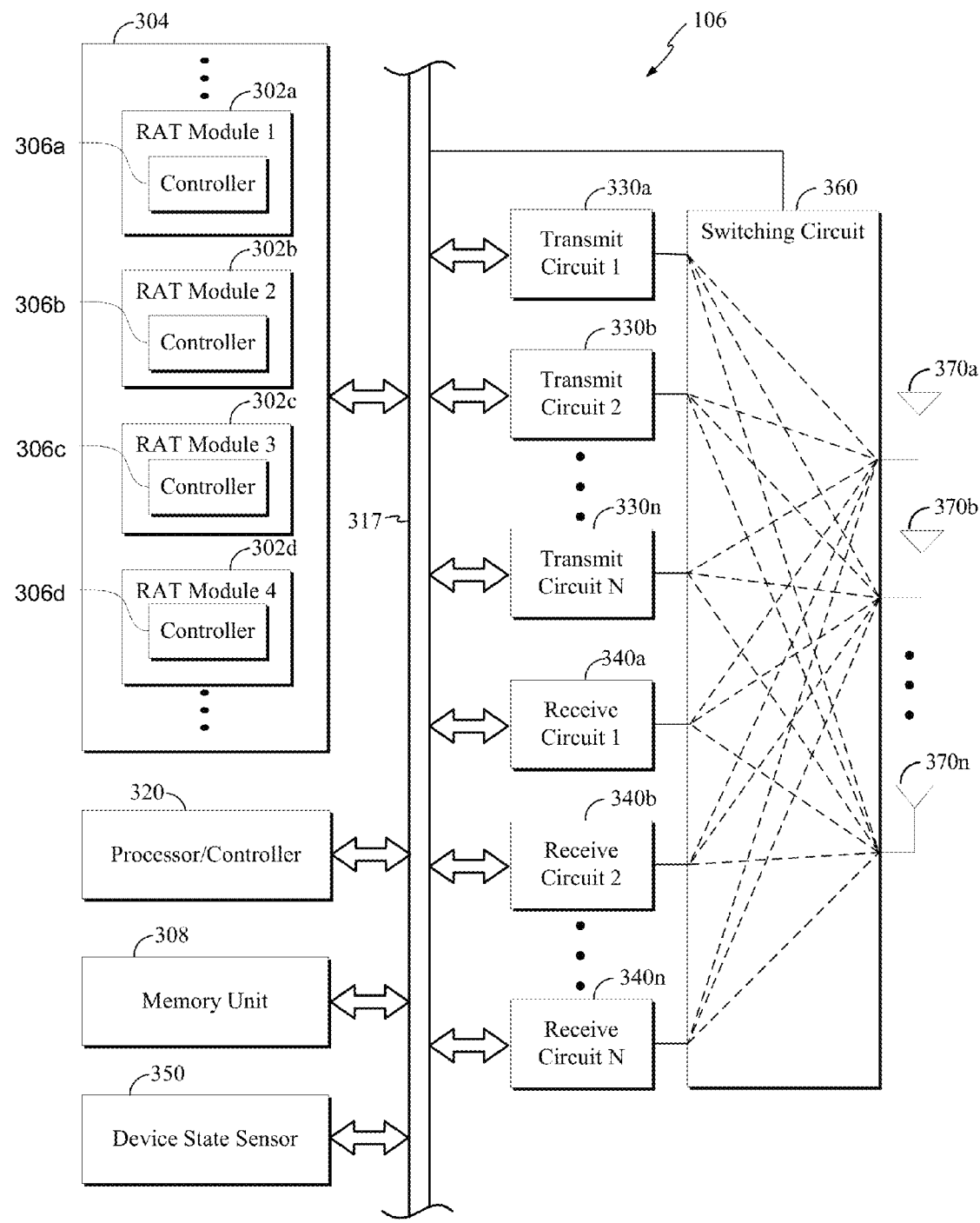
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a central data bus 317 linking several circuits together. The circuits include a controller/processor 320, a memory unit 308, and RAT circuitry 304, which may include various RAT modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors of the processor/controller 320 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different RATs. Each of the RAT modules 302a, 302b, 302c, and 302d may implement a specific RAT and may each individually include additional memory modules, communication components and functions which are applicable to the RAT type implemented by the module. Each RAT module 302a, 302b, 302c, and 302d may include baseband circuitry specific to each radio access technology. Each RAT module 302a, 302b, 302c, and 302d may further include a controller 306a, 306b, 306c, and 306d, each of which may be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore, RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module may include its own transceiver(s), including one or more antennas (not shown). The RAT modules may implement any of the RAT types discussed above with reference to FIGS. 1-2, or any other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications signals via antennas 370a, 370b, and/or 370n. For example, transmit circuit 330a may include a modulator (not shown), a digital-to-analog (D/A) converter (not shown), an amplifier (not shown), as well as other circuitry for modulating and preparing wireless communications signals for transmission via antennas 370a, 370b, and/or 370n. In some embodiments, one of the antennas 370a, 370b, and 370n may function as a primary antenna. In some cases, the RAT circuitry 304 may include transmit circuits 330a, 330b, and 330n where each RAT module 302a, 302b, 302c, and 302d may include one of the transmit circuits 330a, 330b, and 330n. As such, transmit circuits 330a, 330b, and 330n may be configured to transmit according to one or more radio access technologies associated with one of RAT modules 302a, 302b, 302c, and 302d. In some embodiments, one of the transmit circuits 330a, 330b, and 330n may function as a primary transmit circuit. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement wireless communications using OFDM, while a second RAT module 302b may implement a wireless communications using CDMA (e.g., WCDMA, cdma2000, and the like). As such, one transmit circuit 330a may include components configured for OFDM communications while a second transmit circuit 330b may include components configured CDMA communications (e.g., WCDMA, cdma2000, and the like).

The access terminal 106 further comprises one or more receive circuits 340a, 340b, and 340n. Receive circuits 340a, 340b, and 340n may also be referred to as receive chains having one or more components configured to receive wireless communications signals via antennas 370a, 370b, and/or 370n. For example, receive circuit 340a may include an amplifier (not shown), an analog-to-digital converter (not shown), a demodulator (not shown), as well as other circuitry for receiving and demodulating wireless communications signals received via antennas 370a, 370b, and/or 370n. In some cases, the RAT circuitry 304 may include receive circuits 340a, 340b, and 340n where each RAT module 302a, 302b, 302c, and 302d may include one or more of the receive circuits 340a, 340b, and 340n. As such, each of receive circuits 340a, 340b, and 340n may be configured to receive according to a radio access technology associated with one of the RAT modules 302a, 302b, 302c, and 302d. In some embodiments, one of the receive circuits 340a, 340b, and 340n may function as a primary receive circuit. In some cases, the access terminal 106 may have one receive circuit 340a. In other cases, one or more of the receive circuits 340a, 340b, and 340n may be activated or deactivated.

Transmit circuits 330a, 330b, and 330n may process and convert base-band signals to high-frequency (HF) signals for transmission. Receive circuits 340a, 340b, and 340n in turn may process and buffer received signals before sending the signals to the data bus 317. Transmit circuits 330a, 330b, and 330n may process and buffer the data from the data bus 317 before transmitting the signals from the access terminal 106. The processor/controller 320 controls timing of the various components of the access terminal.

Each of transmit circuits 330a, 330b, and 330n and receive circuits 340a, 340b, and 340n may be configured to respectively transmit and receive via one or more of the antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice communications via antenna 370a while another transmit circuit 330b may be used for transmitting non-voice data via antenna 370b. Stated another way, a first transmit circuit 330a may be used for transmitting and receiving voice communications (e.g., WCDMA, cdma2000, and the like) via antenna 370a while a second transmit circuit 330b may be used for data only communications (e.g., data only (DO) LTE) via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal or lateral) ends or corners of the access terminal 106 or adjacent to each other. Generally, antennas 370a, 370b, and 370n can be located at similar or distinct places as desired or in accordance with device design.

A switching circuit 360 may be provided to allow a processor/controller 320 to select the antennas 370a, 370b, and 370n for which transmit circuits 330a, 330b, and 330n or receive circuits 340a, 340b, and 340n are configured to transmit and receive. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The processor/controller 320 may be configured to switch transmit circuits 330a, 330b, and 330n and receive circuits 340a, 340b, and 340n to respectively transmit and receive via any combination of antennas 370a, 370b, and 370n. In some embodiments, the transmit circuits 330a, 330b, and 330n, and receive circuits 340a, 340b, and 340n may be included within RAT modules 302a, 302b, 302c, and 302d. As such, in some embodiments, the switching circuit 360 may be configured to switch each RAT module 302a, 302b, 302c, and 302d to respectively transmit and receive via any combination of antennas 370a, 370b, and 370n. In some embodiments, a RAT module 302a may determine an appropriate antenna and may direct the switching via the switching circuit 360. In other embodiments, the processor/controller 320 may direct the switching. In other embodiments, the RAT module 302a in combination with the processor/controller 320 may direct the switching.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as some switching functions, are software routines, modules, and/or data sets. The memory unit 308 can be tied to another memory circuit (not shown), which may be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors may be placed next to the antennas 370a, 370b, and 370n. Each of the multiple proximity sensors is configured to detect whether an object is in proximity to (e.g., blocking) a respective antenna 370a, 370b, and 370n. The device state sensor 350 may further include and/or be configured as an orientation sensor that may be configured to detect the orientation of the access terminal 106 with respect to the user of the access terminal 106. For example, the orientation sensor may include any suitable sensor, such as an accelerometer, a gyroscope, or the like. The device state sensor 350 may further include and/or be configured as other types of sensors for detecting a temporary condition or state of the access terminal 106. While shown as one functional block, multiple device state sensors of different types may be included. For example, the access terminal 106 may include both a separate proximity sensor and a separate orientation sensor.

In this specification and the appended claims, it should be clear that the terms "circuit," "circuitry," and the like are construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Access terminal 106 performance may be negatively affected by diminishing performance characteristics of the antennas 370a, 370b, 370n, due to, for example, blockage, fading, path loss, and/or design differences of the antennas 370a, 370b, 370n. For example, due to a hand or body blocking an antenna, device performance may be severely impacted. In some scenarios, the impact may lead to dropped calls or paging failures (e.g., missing pages when the access terminal 106 is in an idle state). Also, blocking may in some instances cause higher transmit power, which may lead to increased interference to the communication network and high power consumption. When the performance characteristics of one or more antennas are impacted to a certain extent, the access terminal 106 may fail to receive incoming calls and/or may fail to maintain a proper connection with the network. Accordingly, systems, apparatus, and methods are needed for initiating a switch from a first antenna to a second antenna based on the performance characteristics of the antennas so that the access terminal 106 may avoid significant signal degradation for both uplink and downlink communications. The selection may depend on several factors, which will be described in detail below.

Depending on these factors, one or more of the antennas may be selected in a manner to improve signal reception/transmission performance.

Figure 4:
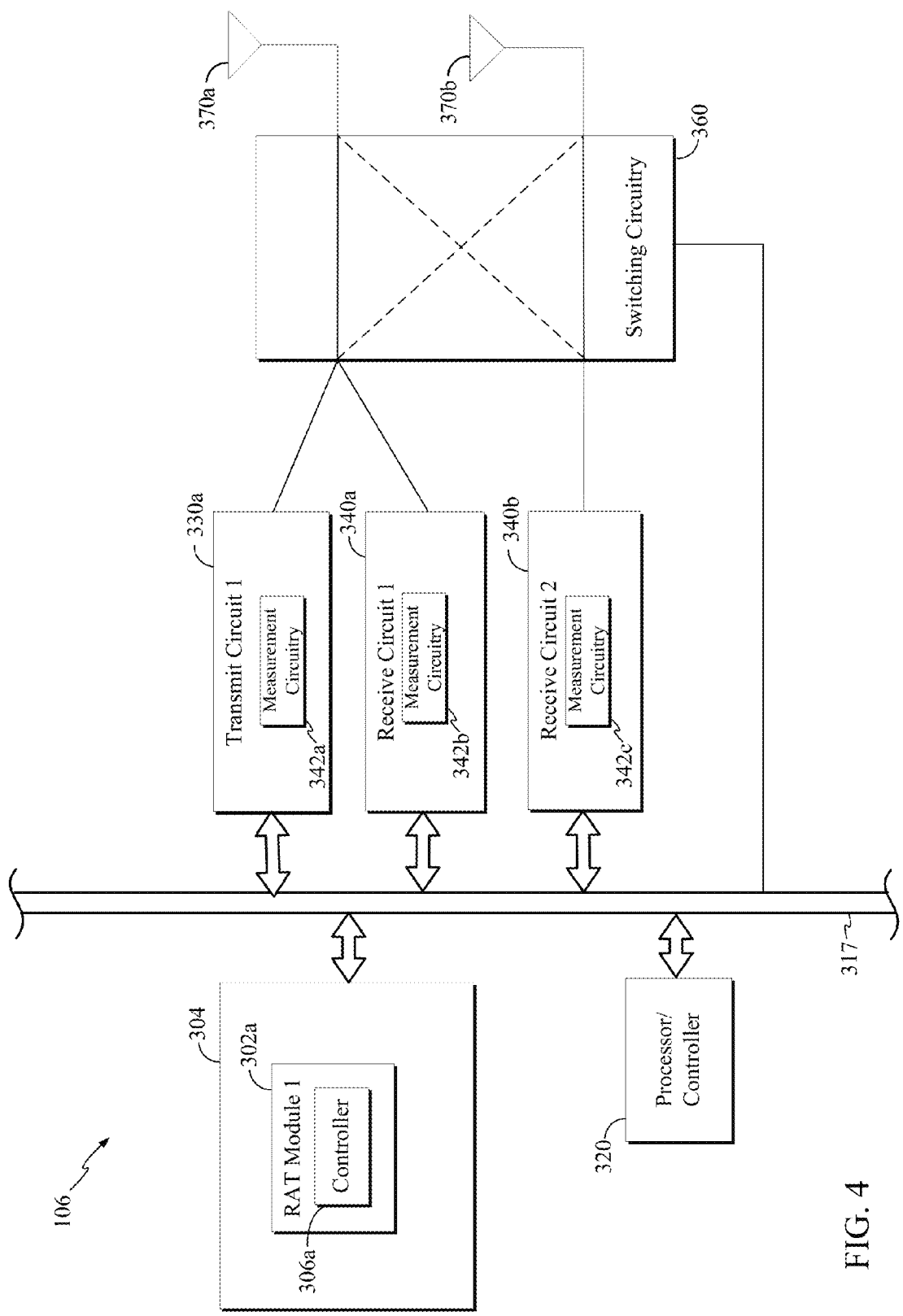
FIG. 4 is a functional block diagram of an embodiment of the access terminal shown in FIG. 3 in accordance with some embodiments.

FIG. 4 is a functional block diagram of an embodiment of the access terminal 106 shown in FIG. 3 in accordance with some embodiments. In some cases, the access terminal 106 may include two antennas 370a and 370b. The access terminal may further include a transmit circuit 330a, two receive circuits 340a and 340b, switching circuitry 360, a processor/controller 320, and RAT circuitry 304. The receive circuit 340a may be associated with the transmit circuit 330a in that the receive circuit 340a is configured to communicate via the same antenna 370a or 370b as that used by the transmit circuit 330a. As such, the processor/controller 320, the RAT Module 302a, or a combination thereof may be configured to switch the transmit circuit 330a and receive circuit 340a to respectively transmit and receive via the same antenna 370a or the antenna 370b. Stated another way, the first receive circuit 340a may be configured to be switched alongside the transmit circuit 330a. The RAT module 302a may include baseband circuitry specific to each radio access technology for which transmit circuit 330a, receive circuit 340a, and receive circuit 340b are configured to communicate.

In some embodiments, receive circuit 340a may be referred to as a primary receive circuit 340a, and receive circuit 340b may be referred to as a secondary receive circuit 340b. As illustrated in FIG. 4, the switching circuitry 360 is configured in a bar position, thus connecting transmit circuit 330a and receive circuit 340a to the antenna 370a. The antenna that is connected to the transmit circuit 330a and the primary receive circuit 340a may be referred to as a primary antenna, and the antenna that is connected to the secondary receive circuit 340b may be referred to as a secondary antenna. For example, if the switching circuitry 360 is in the bar position, as illustrated in FIG. 4, the antenna 370a is the primary antenna because it is connected to the transmit circuit 330a and the primary receive circuit 340a, and the antenna 370b is the secondary antenna due to its connection to secondary receive circuit 340b. As another example, if the switching circuitry 360 is in a crossbar position (indicated by the diagonal dotted lines in FIG. 4), the antenna 370b would be the primary antenna because it is connected to the transmit circuit 330a and the primary receive circuit 340a, and the antenna 370a would be the secondary antenna due to its connection to secondary receive circuit 340b.

As described above, various factors affecting antenna performance may include certain operating conditions that result in one or more of the antennas 370a and 370b of FIG. 4 being de-sensed or otherwise resulting in one or more performance characteristics of the antennas 370a and/or 370b being reduced. For example, blockage, fading, path loss, and/or design differences of the antennas 370a and 370b may negatively affect antenna performance. Blockage may occur, for example, due to the hand of a user being wrapped around the access terminal 106, effectively blocking one or more of the antennas 370a and 370b. As another example, the access terminal 106 may be positioned such that antennas 370a and/or 370b may operate with less than ideal receive and/or transmit conditions. These scenarios may reduce power levels of received signals, thus making it more difficult to receive and demodulate signals. These scenarios may also make it difficult to effectively transmit signals. For example, blocking one or more of antennas 370a and 370b may reduce the total signal strength such that the transmit circuit 330a may need to increase power levels. However, with respect to increased transmit power levels, an access terminal 106 may be subject to regulatory radio frequency (RF) safety requirements and may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|^2_{rms} \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of allowed transmit power levels. As such, when one or more of the antennas 370a and 370b are blocked, the maximum transmit power level allowed may be significantly reduced in order to avoid exceeding SAR limits.

As operation of the access terminal 106 may affect performance of the antennas 370a and/or 370b, it may be desirable to have dynamic switching systems and methods for configuring the switching circuitry 360 for connecting transmit circuit 330a/receive circuit 340a and receive circuit 340b to antennas 370a and/or 370b, as provided by embodiments described herein. Accordingly, certain aspects of various embodiments described herein are directed to switching transmit circuit 330a/receive circuit 340a and receive circuit 340b for transmitting and receiving via the different antennas 370a and 370b to improve performance of the access terminal 106. As a result, improved performance of the access terminal 106 may be achieved if the transmit circuit 330a and the primary receive circuit 340a are coupled to the highest performing antenna 370a or 370b. For example, the dynamic switching of the transmit and receive circuits may mitigate antenna blockage and may allow for selecting antennas in such a way to meet regulatory limits at the least cost to performance and/or to enable good transmit and receive conditions. Furthermore, in one aspect, transmit antenna selection may allow the mitigation of interference and may provide a target quality of service using the least amount of transmit power.

Referring again to FIG. 4, the processor/controller 320, the RAT Module 302a, or a combination thereof may be configured to selectively switch the transmit circuit 330a and the primary receive circuit 340a to communicate via either the antenna 370a or the antenna 370b. In addition, the secondary receive circuit 340b may be configured to communicate via either of the antennas 370a or 370b that is not being used for the transmit circuit 330a and the receive circuit 340a. Accordingly, the processor/controller 320 and/or the RAT Module 302a may be configured to switch the transmit circuit 330a and the primary receive circuit 340a to communicate via the antenna that has better performance characteristics.

The transmit circuit 330a, the receive circuit 340a, and the receive circuit 340b may include measurement circuitry 342a, 342b, and 342c, respectively, configured to measure performance characteristic metrics. Performance characteristic metrics may include receive and transmit power levels, automatic gain control (AGC) measurements, signal to interference plus noise ratio (SINR), signal to noise ratio, and the like. As one example, the measurement circuitry 342b and 342c may be configured to gather receive AGC measurements. As another example, the measurement circuitry 342a may be configured to gather transmit AGC measurements. In some embodiments, antenna switching may be accomplished by measuring the performance characteristics of antennas 370a and 370b (e.g., signal strength of signals transmitted and received via the antennas, power level, SINR, SNR, and the like) using the measurement circuitry 342a, 342b, and/or 342c. The performance characteristics of antennas 370a and 370b may be compared by the processor/controller 320, the RAT Module 302a, the transmit circuits 330a, the receive circuits 340a, 340b, or a combination thereof. If the performance characteristics of antenna 370b are better than the performance characteristics of antenna 370a, the transmit circuit 330a and receive circuit 340a may be switched to antenna 370b.

In some embodiments, the access terminal 106 may be in different states at different points in time, such as an initialization state, an idle state, an access state, or a traffic or active state. For example, upon being power on, being handed over from another radio access technology, or being directed to another frequency, the access terminal 106 may begin the initialization state. During the initialization state, the access terminal 106 may conduct system acquisition (ACQ) and synchronization in order to establish or re-establish communications via the wireless network. The receive and transmit circuits may also enter an idle state, in which the access terminal 106 may periodically wake up from a sleep state at predetermined wake-up cycles or times in order to receive and monitor pages or other overhead information transmitted over, for example, signaling and control channels. No data is transmitted by the access terminal during the idle state. During the access state, the receive and transmit circuits may attempt to access the system by sending messages or responding to requests from an access point 104. In the traffic or active state, a communications link is established between the access terminal 106 and the access point 104, and data is actively transmitted and received by the corresponding transmit circuit and receive circuit.

As described above, the access terminal 106 may remain in the idle state until a predetermined wake-up time according to a predetermined wake-up cycle or wake-up period. At the predetermined wake-up time, the access terminal 106 may be configured to wake up and determine whether packets are available for transmission to the access terminal 106 by monitoring the pages received from one or more access points 104 and/or other access terminals. For example, the access terminal 106 may be scheduled to wake up every 2.5 seconds for a period of 0.5 seconds according to a wake-up schedule. During each of the predetermined wake-up cycles, the access terminal 106 may detect a paging indicator channel (PICH), demodulate and/or decode signals from the PICH, detect a paging channel (PCH), demodulate and/or decode signals from the PCH, receive a page or a control message, demodulate and/or decode other signals from downlink channels, and/or the like. For example, if the access terminal 106 determines during the predetermined wake-up cycle that a paging message is transmitted in a frame to the access terminal 106, the access terminal 106 may demodulate the paging channel in order to receive the paging message. In some embodiments, during these predetermined wake-up cycles, the access terminal 106 may also measure one or more performance characteristics of one or more of the antennas 370a and 370b to determine whether to switch the antennas being used by the transmit circuit 330a/receive circuit 340a and the receive circuits 340b. In some embodiments, the access terminal 106 may also compare the performance characteristics of the two antennas 370a and 370b during one or more of the predetermined wake-up cycles to determine whether to switch. In some cases, the access terminal 106 may wake up during a period of time outside of a predetermined wake-up cycle to determine whether antenna performance characteristics are such that a switch needs to be made to a different antenna. The period of time outside of the predetermined wake-up cycle may be referred to herein as a measurement wake-up period or measurement wake-up cycle.

Figure 10A:
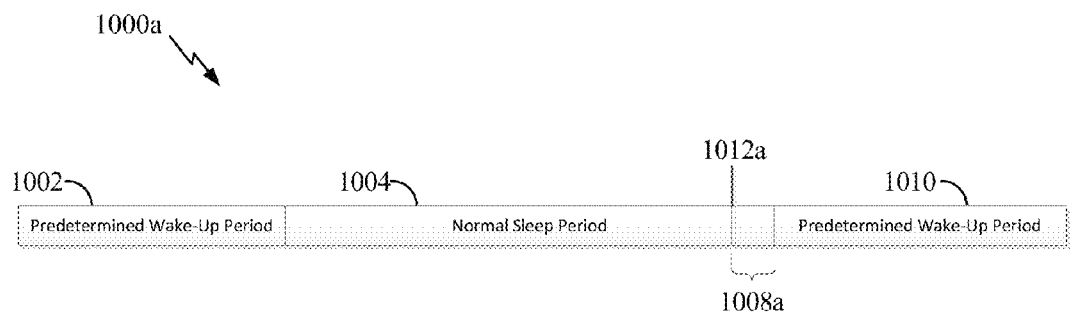
FIGS. 10a-10c illustrate exemplary timing diagrams showing different wake-up times for an access terminal 106.
Figure 10B:
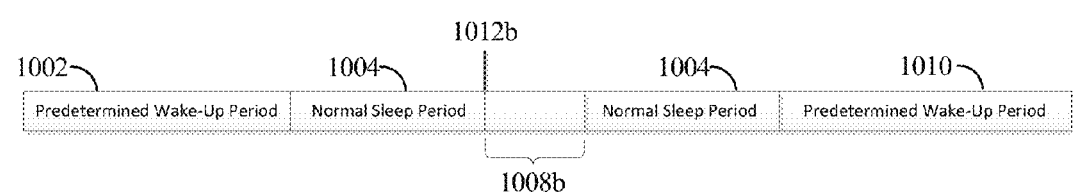
Figure 10C:
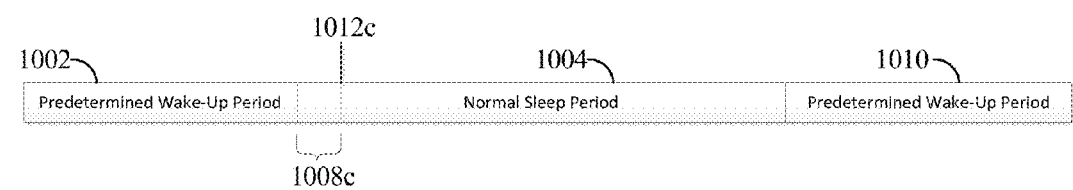

FIGS. 10a-10c illustrate exemplary timing diagrams showing different wake-up times for an access terminal 106. In FIGS. 10a-10c, time progresses from left to right across each of the diagrams. FIG. 10a illustrates a first exemplary timing diagram 1000a. According to the timing diagram 1000a, the access terminal 106 is scheduled to wake up at a first predetermined wake-up period or cycle 1002 according to a wake-up schedule. For example, a wake-up schedule may indicate that the access terminal 106 is scheduled to wake up every 2.5 seconds for a period of 0.5 seconds. The 2.5 seconds may begin from the start of each predetermined wake-up period or cycle. During the predetermined wake-up periods 1002 and 1010, the access terminal 106 may perform various functions, such as detecting a paging indicator channel (PICH), demodulating and/or decoding signals from the PICH, detecting a paging channel (PCH), demodulating and/or decoding signals from the PCH, receiving a page or a control message, demodulating and/or decoding other signals from downlink channels, and/or the like. The access terminal 106 is then scheduled to sleep for a normal sleep period 1004. For example, the normal sleep period 1004 may be a period of 2 seconds. According to the timing diagram 1000a, the access terminal 106 may be configured to wake up at a time 1012a for a measurement cycle or wake-up period 1008a that is outside of a normally scheduled predetermined wake-up cycle. The wake-up period 1008a is earlier than the scheduled predetermined wake-up time for the next predetermined wake-up period 1010 so that the access terminal 106 can perform antenna measurements and antenna selection prior to the predetermined wake-up period 1010. During the measurement wake-up period 1008a, the access terminal 106 does not perform the various functions described above that occur during the scheduled predetermined wake-up periods 1002 and 1010, such as detecting a PICH, demodulating and/or decoding signals from the PICH, detecting a PCH, demodulating and/or decoding signals from the PCH, etc. Accordingly, the access terminal can wake up at time 1012a that is earlier than the normally scheduled predetermined wake-up period 1010 and can use that period of time 1008a for measuring antenna performance and for determining whether to switch the antenna configuration. The measurement wake-up period 1008a may be a period of time that is sufficient to measure antenna performance and make an antenna selection decision, such as a period of 0.25 seconds, 0.5 seconds, etc. As a result, the access terminal 106 can determine at a time immediately preceding the next predetermined wake-up cycle the optimal antenna to use during the next scheduled predetermined wake-up period 1010. This helps to ensure that the antenna switching decision is not outdated. Waking up at time 1012a for the wake-up period 1008a also allows the access terminal 106 to only power on the necessary receive circuitry a single time for the measurement wake-up period 1008a and the predetermined wake-up period 1010.

FIG. 10b illustrates another exemplary timing diagram 1000b. According to the timing diagram 1000b, the access terminal 106 is scheduled to wake up at a first predetermined wake-up period or cycle 1002 according to a wake-up schedule, similar to the timing diagram 1000a. As described above, the access terminal 106 may perform various functions during the predetermined wake-up periods 1002 and 1010, such as detecting a paging indicator channel (PICH), demodulating and/or decoding signals from the PICH, detecting a paging channel (PCH), demodulating and/or decoding signals from the PCH, receiving a page or a control message, demodulating and/or decoding other signals from downlink channels, and/or the like. The access terminal 106 is then scheduled to sleep for a normal sleep period 1004. As one example, the normal sleep period 1004 may be a period of 2 seconds. The access terminal 106 may be configured to wake up at a time 1012b for a measurement cycle or wake-up period 1008b that is outside of a normally scheduled predetermined wake-up cycle. According to the timing diagram 1000b, the wake-up period 1008b may be in the middle of the normal sleep period 1004 or in the middle of the predetermined wake-up periods 1002 and 1010. During the wake-up period 1008b, the access terminal can perform antenna measurements and antenna selection prior to the predetermined wake-up period 1010, but does not perform the various functions described above that occur during the predetermined wake-up periods 1002 and 1010, such as detecting a PICH, demodulating and/or decoding signals from the PICH, detecting a PCH, demodulating and/or decoding signals from the PCH, etc. The measurement wake-up period 1008b may be a period of time that is sufficient to measure antenna performance and make an antenna selection decision, such as a period of 0.25 seconds, 0.5 seconds, etc. It will be apparent to one of skill in the art that the access terminal 106 may wake up during any period between the predetermined wake-up periods 1002 and 1010 to perform antenna measurements and antenna selection. Accordingly, the access terminal 106 can wake-up during the normal sleep period 1004 to determine the optimal antenna to use during the next scheduled predetermined wake-up period 1010 and then go back to sleep for the remainder of the sleep period 1004. The access terminal 106 may use more power than that used for the timing diagram 1000a because the necessary receive circuitry must be powered on once at time 1012b and again at the beginning of the next predetermined wake-up period 1010.

FIG. 10c illustrates another exemplary timing diagram 1000c. According to the timing diagram 1000c, the access terminal 106 is scheduled to wake up at a first predetermined wake-up period or cycle 1002 according to a wake-up schedule, similar to the timing diagram 1000a. As described above, the access terminal 106 may perform various functions during the predetermined wake-up periods 1002 and 1010, such as detecting a paging indicator channel (PICH), demodulating and/or decoding signals from the PICH, detecting a paging channel (PCH), demodulating and/or decoding signals from the PCH, receiving a page or a control message, demodulating and/or decoding other signals from downlink channels, and/or the like. According to the timing diagram 1000c, the access terminal 106 may be configured to stay awake for a measurement cycle or wake-up period 1008c that is outside of a normally scheduled predetermined wake-up cycle. The wake-up period 1008c is an extension of the predetermined wake-up period 1002, which provides an amount of time for the access terminal 106 to perform antenna measurements and antenna selection prior to the predetermined wake-up period 1010. During the measurement wake-up period 1008c, the access terminal 106 does not perform the various functions described above that occur during the scheduled predetermined wake-up periods 1002 and 1010, such as detecting a PICH, demodulating and/or decoding signals from the PICH, detecting a PCH, demodulating and/or decoding signals from the PCH, etc. At the end of the wake-up period 1008c, the access terminal is configured to sleep at a time 1012c for the remainder of the normal sleep period 1004. Accordingly, the access terminal can stay awake for an extended period of time 1008c at the end of the normally scheduled predetermined wake-up period 1002 and can use the period of time 1008c for measuring antenna performance and for determining whether to switch the antenna configuration. This allows the access terminal to determine the best antenna to use during the next scheduled predetermined wake-up period 1010. The access terminal 106 may use less power than that used for the timing diagram 1000b because the necessary receive circuitry is only powered on once for the predetermined wake-up period 1002 and the extended wake-up period 1008c.

Accordingly, various devices, systems, and methods are described herein for initiating a switch of a transmit circuit and/or receive circuit from a first antenna to second antenna if one or more performance characteristics of the first antenna and/or the second antenna are worse than some predetermined thresholds in a number of measurement cycles. A measurement cycle may include a predetermined wake-up cycle or a period of time outside of a predetermined wake-up cycle, as described above. In some embodiments, the performance characteristics include downlink performance metrics, such as a receive power level of the antenna. The predetermined threshold may be determined based on a power level, interference level, or some other performance characteristic, that is sufficient to support the particular type of communications (e.g., voice, data, etc.). For example, if a threshold power level is used, the determination of whether to switch antennas would be based on whether the detected power level is below the threshold power level. On the other hand, in the event a threshold interference level, or the like, is used, the determination to switch antennas would be based on whether the detected interference is above the threshold interference level.

Figure 5:
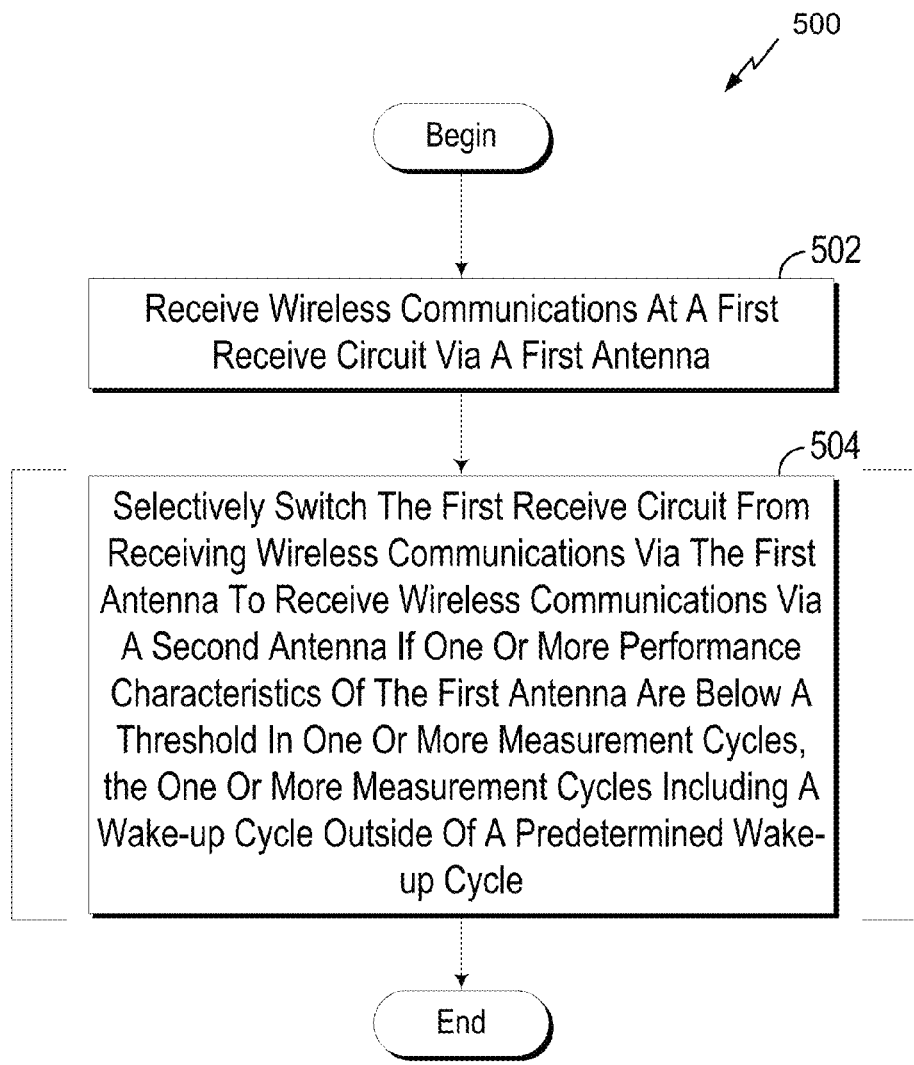
FIG. 5 is a flowchart of an implementation of an exemplary method implemented by a wireless communication apparatus in accordance with some embodiments in accordance with some embodiments.

FIG. 5 illustrates a flowchart of an implementation of an exemplary method 500 implemented by a wireless communication apparatus in accordance with some embodiments. The method 500 may be implemented at a wireless communication apparatus implemented as an access terminal 106, for example. Although the method 500 is described below with respect to elements of the access terminal 106, those having ordinary skill in the art will appreciate that other components may be used to implement one or more of the blocks described herein.

At block 502, wireless communications are received at a first receive circuit via a first antenna. In one embodiment, the first receive circuit may include receive circuit 340a and the first antenna may include antenna 370a. At block 504, the method continues by selectively switching the first receive circuit from receiving wireless communications via the first antenna to receive wireless communications via a second antenna if one or more performance characteristics of the first antenna are below a threshold in one or more measurement cycles, the one or more measurement cycles including a wake-up cycle outside of a predetermined wake-up cycle. In one embodiment, a processor/controller 320, the RAT Module 302a, or a combination thereof may control switching circuitry 360 to perform the switching. Different antenna performance characteristic metrics may be used to determine the threshold level. For example, a threshold power level may is used, in which the determination of whether to selectively switch from the first antenna to the second antenna would be based on whether the detected power level is below the threshold power level. On the other hand, in the event a threshold interference level, or the like, is used, the determination to switch antennas would be based on whether the detected interference is above the threshold interference level.

In some embodiments, the one or more performance characteristics of the first antenna include one or more downlink performance metrics. For example, the downlink performance metrics may include a receive power level of the antenna such as receive automatic gain control (AGC) measurements. In some embodiments, the one or more measurement cycles includes at least one predetermined wake-up cycle.

In some embodiments, the method further comprises selectively switching if the one or more downlink performance metrics of the first antenna are below the threshold during a first measurement cycle.

In some embodiments, the method further comprises monitoring the one or more downlink performance metrics of the first antenna outside of a first measurement cycle (during a measurement wake-up period or cycle) if the one or more downlink performance metrics are below the threshold during the first measurement cycle, and selectively switching if the one or more downlink performance metrics of the first antenna outside of the first measurement cycle are below the threshold.

In some embodiments, the method further comprises monitoring one or more downlink performance metrics of the second antenna outside of a first measurement cycle (during a measurement wake-up period or cycle) if the one or more downlink performance metrics of the first antenna are below the threshold during the first measurement cycle, and selectively switching if the one or more downlink performance metrics of the second antenna outside of the first measurement cycle are above the threshold.

In some embodiments, the method further comprises monitoring one or more downlink performance metrics of the first antenna and the second antenna outside of a first measurement cycle (during a measurement wake-up period or cycle) if the one or more downlink performance metrics of the first antenna are below the threshold during the first measurement cycle, and selectively switching if the one or more downlink performance metrics of the second antenna outside of the first measurement cycle are higher than the one or more downlink performance metrics of the first antenna outside of the first measurement cycle.

In some embodiments, the method further comprises serially monitoring the downlink performance metrics of first antenna and the second antenna. The serially monitoring includes monitoring the downlink performance metrics of the first antenna using the first receive circuit, and monitoring the downlink performance metrics of the second antenna using the first receive circuit after the downlink performance metrics of the first antenna have been monitored. Based on the serial monitoring, the method may determine whether to switch from the first antenna to the second antenna based on the detected performance characteristics.

In some embodiments, the method further comprises selectively switching back from the second antenna to the first antenna if one or more downlink performance metrics of the second antenna in a second measurement cycle are below the threshold and are lower the than one or more downlink performance metrics of the first antenna during the second measurement cycle.

Various implementations of block 504, as shown in brackets in FIG. 5, will now be described with reference to FIGS. 6-9, which include different methods of selectively switching a receive circuit from receiving wireless communications via a first antenna to receive wireless communications via a second antenna if one or more performance characteristics of the first antenna are worse than a threshold in one or more measurement cycles. For example, if the performance characteristics are below or above the threshold, depending on the type of threshold used (e.g., power level, interference level, etc.), in one or more measurement cycles, the processor/controller 320, the RAT Module 302a, or a combination thereof may selectively switch the receive circuit from the first antenna to a second antenna.

Figure 6:
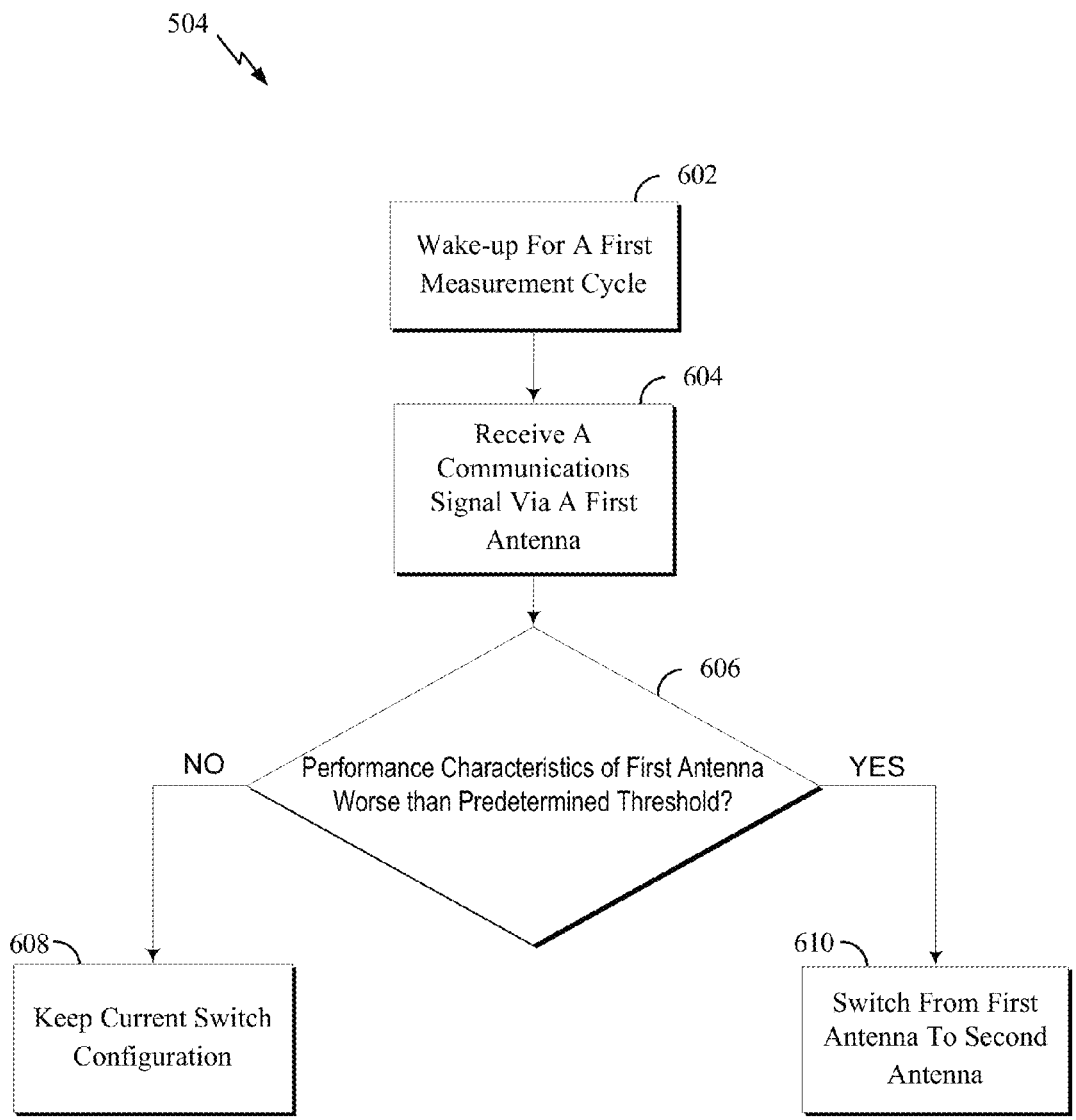
FIG. 6 is a flowchart of an implementation of another exemplary method implemented by a wireless communication apparatus in accordance with some embodiments in accordance with some embodiments.

FIG. 6 shows a flowchart of an implementation of an exemplary method 504 illustrating an embodiment of block 504 as shown in brackets in FIG. 5. According to the method 504 illustrated in FIG. 6, the processor/controller 320, the RAT Module 302a, or a combination thereof may cause the switching circuit 360 to selectively switch the transmit circuit 330a and the primary receive circuit 340a from transmitting and receiving via the first antenna 370a (bar position) to transmitting and receiving via the second antenna 370b (crossbar position) if performance characteristics of the first antenna 370a in a first number of measurement cycles is worse than a predetermined threshold. For example, at block 602, the access terminal 106 wakes up for a first measurement cycle. In some embodiments, the first measurement cycle may be a predetermined wake-up cycle time according to a wake-up schedule as negotiated with the network. For example, when the access terminal 106 is in an idle state, the access terminal 106 may wake-up from a sleep state at the predetermined wake-up time to monitor signaling and/or control channels for messages, such as pages or other overhead information. The wake-up schedule, for example, may schedule the access terminal 106 to wake up at a predetermined wake-up cycle every 2.5 seconds for a period of 0.5 seconds in order to receive a page or other message. In some embodiments, the first measurement cycle may be a wake-up cycle time outside of the predetermined wake-up cycle, such as a measurement wake-up period or cycle described above with respect to FIGS. 10a-10c. For example, the access terminal 106 may negotiate a time outside of the predetermined wake-up cycle with the network when the access terminal 106 will wake up to monitor antenna performance.

At block 604, the access terminal 106 receives a communications signal via a first antenna during the first measurement cycle. For example, the first antenna 370a may be connected via the switching circuit 360 to the first receive circuit 340a. The receive circuit 340a, the processor/controller 320, the RAT Module 302a, or a combination thereof may monitor performance characteristics of the first antenna 370a during the first measurement cycle. As described above, the first measurement cycle may be a predetermined wake-up cycle time or may be a wake-up time outside of a predetermined wake-up cycle (during a measurement wake-up period or cycle). The performance characteristics may include any type of performance characteristic of an antenna, including, but not limited to, receive power level, signal strength, interference level, and the like.

At block 606, the receive circuit 340a, the processor/controller 320, the RAT Module 302a, or a combination thereof may determine whether the performance characteristics of the first antenna 370a are worse than a predetermined threshold. The comparison to the threshold depends on the specific antenna performance characteristic being detected. For example, a threshold power level may is used, in which the determination of whether to selectively switch from the first antenna to the second antenna would be based on whether the detected power level is below the threshold power level. As another example, a threshold interference level may be used, and the determination as whether to switch antennas would be based on whether the detected interference is above the threshold interference level. At block 610, if the receive circuit 340a, the processor/controller 320, and/or the RAT Module 302a determines that the performance characteristics of the first antenna 370a are worse than the threshold level during the first measurement cycle, the processor/controller 320, the RAT Module 302a, or a combination thereof may cause the switching circuit 360 to switch to a crossbar position so that the transmit circuit 330a and the primary receiving circuit 340a are switched from antenna 370a to antenna 370b. Accordingly, secondary receiving antenna 340b is switched from antenna 370b to antenna 370a.

At block 608, if the receive circuit 340a, the processor/controller 320, and/or the RAT Module 302a determines that the performance characteristics of the first antenna 370a are not worse than the threshold level during the first measurement cycle, the current switching circuitry 360 position is maintained and the transmit circuit 330a and the primary receive circuit 340a continue to use antenna 370a.

In some embodiments, the access terminal 106 may wake up at a next wake-up cycle (either at the next predetermined wake-up time or outside of the predetermined wake-up cycle during a measurement wake-up period or cycle) and measure the performance characteristics of the first antenna again prior to switching to the second antenna.

Accordingly, the receiving circuit 340a may be switched from the first antenna 370a to the second antenna 370b without measuring the performance characteristics of the second antenna 370b. This may allow the access terminal 106 to consume less power and quickly switch antennas in the event the currently used antenna falls below acceptable performance characteristics.

Figure 7:
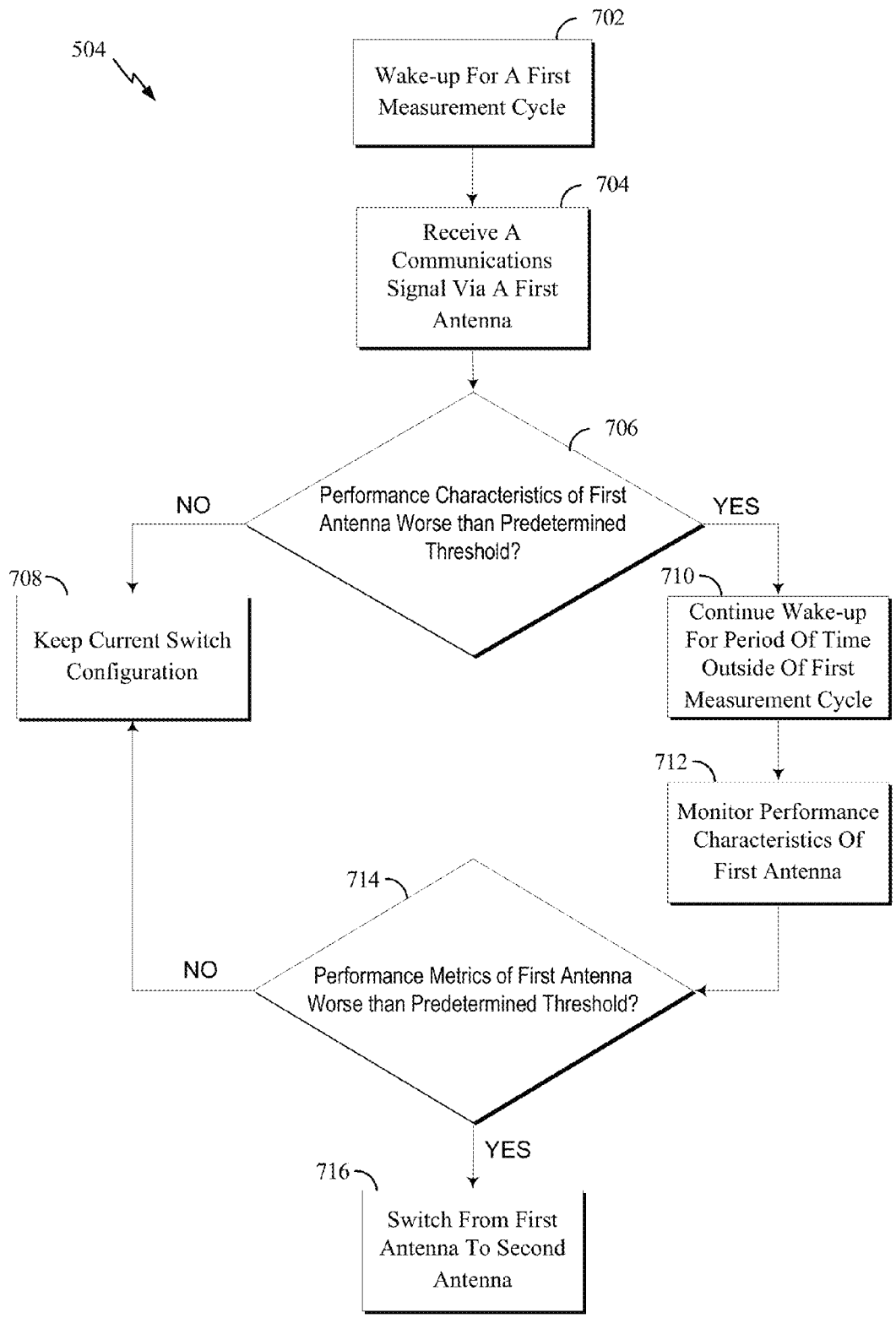
FIG. 7 is a flowchart of an implementation of another exemplary method implemented by a wireless communication apparatus in accordance with some embodiments in accordance with some embodiments.

FIG. 7 shows a flowchart of an implementation of an exemplary method 504 illustrating another embodiment of block 504 as shown in brackets in FIG. 5. According to the method 504 illustrated in FIG. 7, if the performance characteristics of the first antenna 370a during a first measurement cycle are worse than a predetermined threshold, the receiving circuit 340a, the processor/controller 320, the RAT Module 302a, or a combination thereof may continue to monitor the performance characteristics first antenna for a period of time outside of the first measurement cycle (during a measurement wake-up period or cycle). The processor/controller 320, the RAT Module 302a, or a combination thereof may cause the switching circuit 360 to selectively switch the transmit circuit 330a and the primary receive circuit 340a from transmitting and receiving via the first antenna 370a (bar position) to transmitting and receiving via the second antenna 370b (crossbar position) if performance characteristics of the first antenna 370a continue to be worse than the predetermined threshold during the period of time outside of the first measurement cycle (during the measurement wake-up period or cycle).

For example, at block 702, the access terminal 106 wakes up for a first measurement cycle. The first measurement cycle may be a predetermined wake-up cycle time according to a wake-up schedule as negotiated with the network. For example, while in an idle state, the access terminal 106 may wake-up at the predetermined wake-up time to monitor signaling and/or control channels for messages, such as pages or other overhead information. For example, the access terminal 106 may be scheduled to wake up at a predetermined wake-up cycle every 2.5 seconds for a period of 0.5 seconds in order to receive a page or other message. In some embodiments, the first measurement cycle may be a wake-up cycle time outside of the predetermined wake-up cycle. For example, the access terminal 106 may negotiate a time outside of the predetermined wake-up cycle with the network when the access terminal 106 will wake up to monitor antenna performance.

At block 704, the access terminal 106 receives a communications signal via a first antenna during the first measurement cycle. For example, the first antenna 370a may be connected via the switching circuit 360 to the first receive circuit 340a. The receive circuit 340a, the processor/controller 320, the RAT Module 302a, or a combination thereof may monitor performance characteristics of the first antenna 370a during the first measurement cycle. The performance characteristics may include any type of performance characteristic of an antenna, including, but not limited to, receive power level, signal strength, interference level, and the like.

At block 706, the receive circuit 340a, the processor/controller 320, the RAT Module 302a, or a combination thereof may determine whether the performance characteristics of the first antenna 370a are worse than a predetermined threshold. The comparison to the threshold depends on the specific antenna performance characteristic being detected, and may include, for example, a power level, a signal strength, an interference level, and the like. For example, if a threshold power level is used, the comparison is based on whether the detected power level is below the threshold power level. As another example, if a threshold interference level is used, the comparison is based on whether the detected interference is above the threshold interference level. At block 708, if the receive circuit 340a, the processor/controller 320, and/or the RAT Module 302a determines that the performance characteristics of the first antenna 370a are not worse than the threshold level during the first measurement cycle, the current switching circuitry 360 position is maintained and the transmit circuit 330a and the primary receive circuit 340a continue to use antenna 370a. Accordingly, the secondary receive circuit 340b continues to use antenna 370b.

At block 710, if the receive circuit 340a, the processor/controller 320, and/or the RAT Module 302a determines that the performance characteristics of the first antenna 370a are worse than the threshold level during the first measurement cycle, the receive circuit 340a, the processor/controller 320, and/or the RAT Module 302a causes the access terminal 106 to continue to stay awake for a period of time outside of the first measurement cycle. At block 712, the performance characteristics of the first antenna 370a are monitored for the period of time outside of the first measurement cycle. In one example, the first measurement cycle may be a predetermined wake-up cycle according to the network wake-up schedule, and the period of time outside of that wake-up cycle may be an extended period of time for the access terminal 106 to stay awake for monitoring performance characteristics of the first antenna 370a. For example, the access terminal 106 may stay awake for the measurement wake-up period 1008c described above with respect to FIG. 10c. As one example, the access terminal 106 may be scheduled to wake up at a predetermined wake-up cycle every 2.5 seconds for a period of 0.5 seconds in order to receive a page or other message. The extended period of time outside of that predetermined wake-up cycle may, for example, include an extra 0.5 seconds so that the access terminal 106 can continue to measure the performance characteristics of the first antenna 370a.

In another example, the access terminal 106 may wake up for periods 1008a or 1008b to monitor the performance characteristics of the first antenna 370a. In another example, the first measurement cycle may be a wake-up cycle time period other than a predetermined wake-up cycle, and the period of time outside of that wake-up cycle may be an additional period of time outside of the predetermined wake-up cycle so that the access terminal 106 may stay awake and monitor the performance characteristics for a time period that is additional to the first measurement cycle.

Those skilled in the art will appreciate that various specific periods of time in addition to the predetermined wake-up cycle times may be used to monitor antenna performance characteristics, such as an extra 0.1, 0.2, 0.3, 0.4, 0.5, 0.6, 0.7, 0.8, 0.9, or 1.0 seconds.

At block 714, the receive circuit 340a, the processor/controller 320, the RAT Module 302a, or a combination thereof may determine whether the performance characteristics of the first antenna 370a continue to be worse than the predetermined threshold during the extra period of time outside of the first measurement cycle.

At block 716, if the receive circuit 340a, the processor/controller 320, and/or the RAT Module 302a determines that the performance characteristics of the first antenna 370a continue to be worse than the threshold level during the period of time outside of the first measurement cycle, the processor/controller 320, the RAT Module 302a, or a combination thereof may cause the switching circuit 360 to switch to a crossbar position so that the transmit circuit 330a and the primary receiving circuit 340a are switched from antenna 370a to antenna 370b. Accordingly, secondary receiving antenna 340b is switched from antenna 370b to antenna 370a.

If the receive circuit 340a, the processor/controller 320, and/or the RAT Module 302a determines that the performance characteristics of the first antenna 370a are not worse than the threshold level during the extra period of time outside of the first measurement cycle, the method returns to block 708, and the current switching circuitry 360 position is maintained so that the transmit circuit 330a and the primary receive circuit 340a continue to use antenna 370a.

Accordingly, the receiving circuit 340a may be switched from the first antenna 370a to the second antenna 370b without measuring the performance characteristics of the second antenna 370b after monitoring the performance characteristics of the first antenna 370a for an extended period of time relative to a normal wake-up cycle period. This may allow the access terminal 106 to make sure that accurate performance metrics of the currently used antenna are determined while still allowing the access terminal 106 to quickly switch antennas in the event the currently used antenna falls below acceptable performance characteristics.

Figure 8:
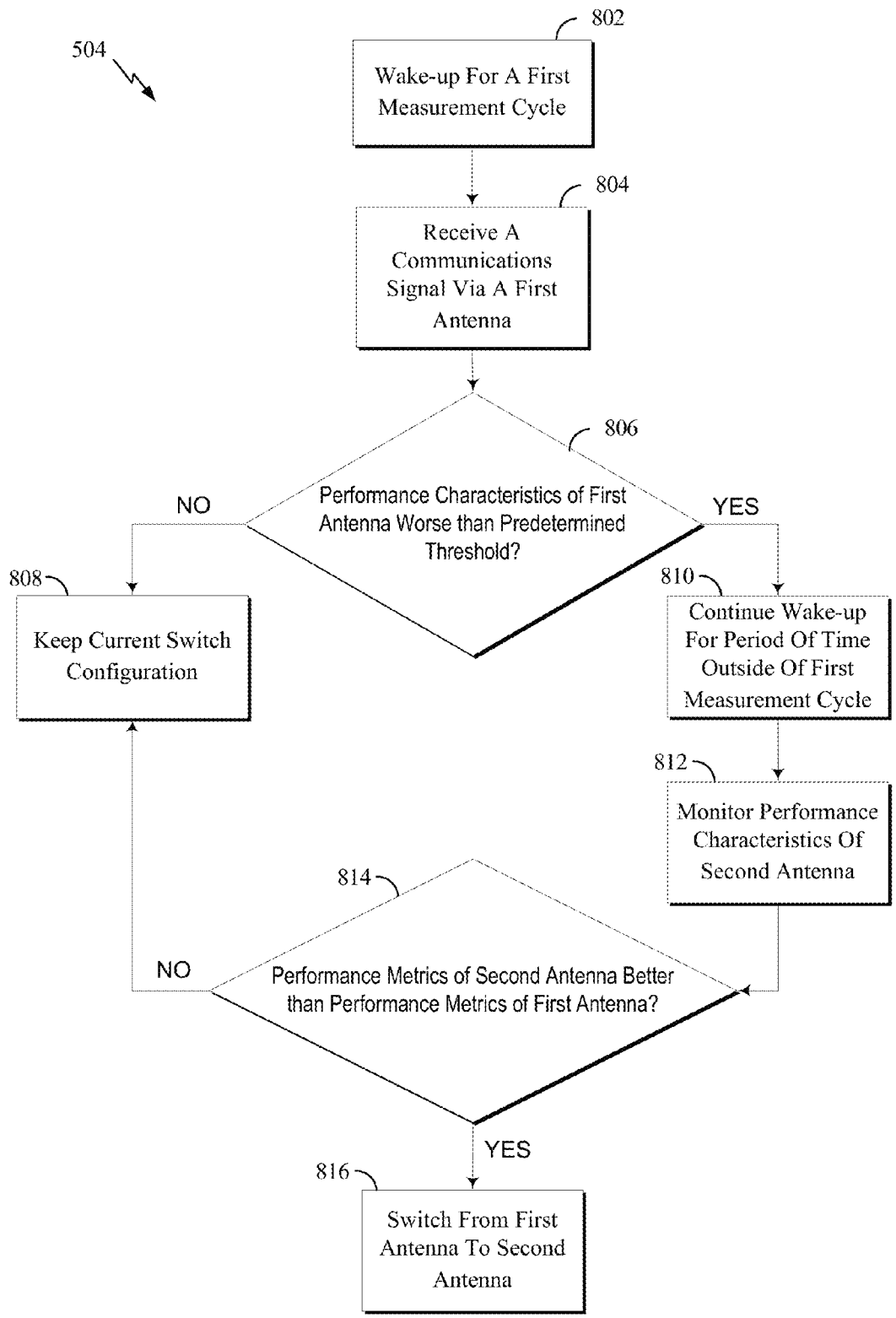
FIG. 8 is a flowchart of an implementation of another exemplary method implemented by a wireless communication apparatus in accordance with some embodiments in accordance with some embodiments.

FIG. 8 shows a flowchart of an implementation of an exemplary method 504 illustrating another embodiment of block 504 as shown in brackets in FIG. 5. According to the method 504 illustrated in FIG. 8, if the performance characteristics of the first antenna 370a during a first measurement cycle are worse than a predetermined threshold, the receiving circuit 340a, the processor/controller 320, the RAT Module 302a, or a combination thereof may monitor the performance characteristics of the second antenna 370b for a period of time outside of the first measurement cycle. The processor/controller 320, the RAT Module 302a, or a combination thereof may cause the switching circuit 360 to selectively switch the transmit circuit 330a and the primary receive circuit 340a from transmitting and receiving via the first antenna 370a (bar position) to transmitting and receiving via the second antenna 370b (crossbar position) if the performance characteristics of the second antenna 370b are better than the performance metrics of the first antenna 370a.

For example, at block 802, the access terminal 106 wakes up for a first measurement cycle. In some embodiments, the first measurement cycle may be a predetermined wake-up cycle time according to a wake-up schedule as negotiated with the network. For example, the access terminal 106 may be in an idle state, during which the access terminal 106 may wake-up at the predetermined wake-up time to monitor signaling and/or control channels for messages, such as pages or other overhead information. For example, the access terminal 106 may be scheduled to wake up at a predetermined wake-up cycle every 2.5 seconds for a period of 0.5 seconds in order to receive a page or other message. In some embodiments, the first measurement cycle may be a wake-up cycle time outside of the predetermined wake-up cycle. For example, the access terminal 106 may negotiate a time outside of the predetermined wake-up cycle with the network when the access terminal 106 will wake up to monitor antenna performance.

At block 804, the access terminal 106 receives a communications signal via a first antenna during the first measurement cycle. For example, the first antenna 370a may be connected via the switching circuit 360 to the first receive circuit 340a. The receive circuit 340a, the processor/controller 320, the RAT Module 302a, or a combination thereof may monitor performance characteristics of the first antenna 370a during the first measurement cycle. The performance characteristics may include any type of performance characteristic of an antenna, including, but not limited to, receive power level, signal strength, interference level, and the like.

At block 806, the receive circuit 340a, the processor/controller 320, the RAT Module 302a, or a combination thereof may determine whether the performance characteristics of the first antenna 370a are worse than a predetermined threshold. The comparison to the threshold depends on the specific antenna performance characteristic being detected, which may include a power level, a signal strength, an interference level, and the like. For example, if a threshold power level is used, the comparison is based on whether the detected power level is below the threshold power level. As another example, if a threshold interference level is used, the comparison is based on whether the detected interference is above the threshold interference level. At block 808, if the receive circuit 340a, the processor/controller 320, and/or the RAT Module 302a determines that the performance characteristics of the first antenna 370a are not worse than the threshold level during the first measurement cycle, the current position of the switching circuitry 360 is maintained and the transmit circuit 330a and the primary receive circuit 340a continue to use antenna 370a. Accordingly, the secondary receive circuit 340b continues to use antenna 370b.

At block 810, if the receive circuit 340a, the processor/controller 320, and/or the RAT Module 302a determines that the performance characteristics of the first antenna 370a are worse than the threshold level during the first measurement cycle, the receive circuit 340a, the processor/controller 320, and/or the RAT Module 302a causes the access terminal 106 to continue to stay awake for a period of time outside of the first measurement cycle.

At block 812, the performance characteristics of the second antenna 370b are monitored for the period of time outside of the first measurement cycle. In some embodiments, the primary receive circuit 340a and the transmit circuit 330a may be switched to the second antenna 370b so that the transmit and primary receive circuits 330a, 340a can be used to detect the performance characteristics of antenna 370b. Using the transmit and primary receive circuits 330a, 340a to detect the performance of antenna 370b may allow an accurate indication of the performance that may be achieved if a switching decision is ultimately made to switch the transmit and primary receive circuits 330a, 340a to antenna 370b. In other embodiments, the performance characteristics of the antenna 370b may be detected using the secondary receive circuit 340b, which may allow a faster decision to be made regarding whether to ultimately switch antennas and, in turn, may conserve batter power.

In some embodiments, the first measurement cycle may be a predetermined wake-up cycle according to the network wake-up schedule, and the period of time outside of that wake-up cycle may be an extended period of time for the access terminal 106 to stay awake for monitoring performance characteristics of the second antenna 370b. For example, the access terminal 106 may stay awake for the measurement wake-up period 1008c described above with respect to FIG. 10c. As one example, the access terminal 106 may be scheduled to wake up at a predetermined wake-up cycle every 2.5 seconds for a period of 0.5 seconds in order to receive a page or other message, and the extended period of time outside of that predetermined wake-up cycle may, for example, include an extra 0.5 seconds. The extra time may allow the access terminal 106 to have sufficient time to measure the performance characteristics of the second antenna 370b. In another example, the access terminal 106 may wake up for periods 1008a or 1008b to monitor the performance characteristics of the second antenna 370b. In another example, the first measurement cycle may be a wake-up cycle time period other than a predetermined wake-up cycle, and the period of time outside of that wake-up cycle may be an additional period of time outside of the predetermined wake-up cycle so that the access terminal 106 has ample time to monitor the performance characteristics of the second antenna 370b. Those skilled in the art will appreciate that various specific periods of time in addition to the predetermined wake-up cycle times may be used to monitor antenna performance characteristics, such as an extra 0.1, 0.2, 0.3, 0.4, 0.5, 0.6, 0.7, 0.8, 0.9, or 1.0 seconds.

At block 814, the receive circuit 340a, the processor/controller 320, the RAT Module 302a, or a combination thereof may determine whether the performance characteristics of the second antenna 370b are better than the performance metrics of the first antenna 370a. At block 816, if the receive circuit 340a, the processor/controller 320, and/or the RAT Module 302a determines that the performance characteristics of the second antenna 370b are better than the performance metrics of the first antenna 370a, the processor/controller 320, the RAT Module 302a, or a combination thereof may cause the switching circuit 360 to switch to a crossbar position so that the transmit circuit 330a and the primary receiving circuit 340a are switched from antenna 370a to antenna 370b. Accordingly, secondary receiving antenna 340b is switched from antenna 370b to antenna 370a. In the event the switch has already been configured in a crossbar position so that the transmit circuit 330a and the primary receiving circuit 340a are connected to the antenna 370b to monitor the performance characteristics of the antenna 370b in step 812, the switching circuitry 360 may maintain the crossbar configuration at block 816.

If the receive circuit 340a, the processor/controller 320, and/or the RAT Module 302a determines that the performance characteristics of the second antenna 370b are not better than the first antenna 370a, the method may return to block 808, and the current switching circuitry 360 position is maintained so that the transmit circuit 330a and primary receive circuit 340a continue to use antenna 370a. In the event the switch has previously been configured in a crossbar position so that the transmit circuit 330a and the primary receiving circuit 340a are connected to the antenna 370b to monitor the performance characteristics of the antenna 370b in step 812, the switching circuitry 360 may change the configuration back to a bar position at block 808.

In some embodiments, receive circuit 340a, the processor/controller 320, the RAT Module 302a, or a combination thereof may determine whether the difference between the performance characteristics of antennas 370a and 370b is greater than a threshold difference. The threshold difference may be provided to ensure that switching is not done unnecessarily. For example, it may only be necessary to switch the transmit circuit 330a and receive circuit 340a from antenna 370a to antenna 370b if the difference in performance characteristics between the two antennas is large enough. For example, if a receive power level is used as the performance characteristic, the switch may occur only if the difference between the power levels of the two antennas is greater than 10 dB. The threshold difference may depend on a variety of factors for an imbalance in performance characteristics. For example, if a receive power level is used as the performance characteristic, as the lower of the two antenna receive power levels approaches a receive power floor, the threshold to switch may be decreased (i.e., less difference between the two power levels is required to trigger a switch to the other antenna). In one aspect, the receive power floor may correspond to a thermal noise limit. The threshold difference may be further based on interference levels and thermal levels.

Accordingly, the receiving circuit 340a may be switched from the first antenna 370a to the second antenna 370b after measuring the performance characteristics of the second antenna 370b during an extended period of time relative to a normal wake-up cycle period. The method illustrated in FIG. 8 thus allows the performance characteristics of the first antenna 370a and the second antenna 370b to be compared prior to determining whether to switch the receiving circuit 340a from the first antenna 370a to the second antenna 370b. While potentially consuming more battery power than the methods illustrated in FIGS. 6 and/or 7, the method of FIG. 8 ensures that the access terminal 106 does not make futile switching decisions without first knowing the performance characteristics of the antenna to which the access terminal 106 may be switched.

Figure 9:
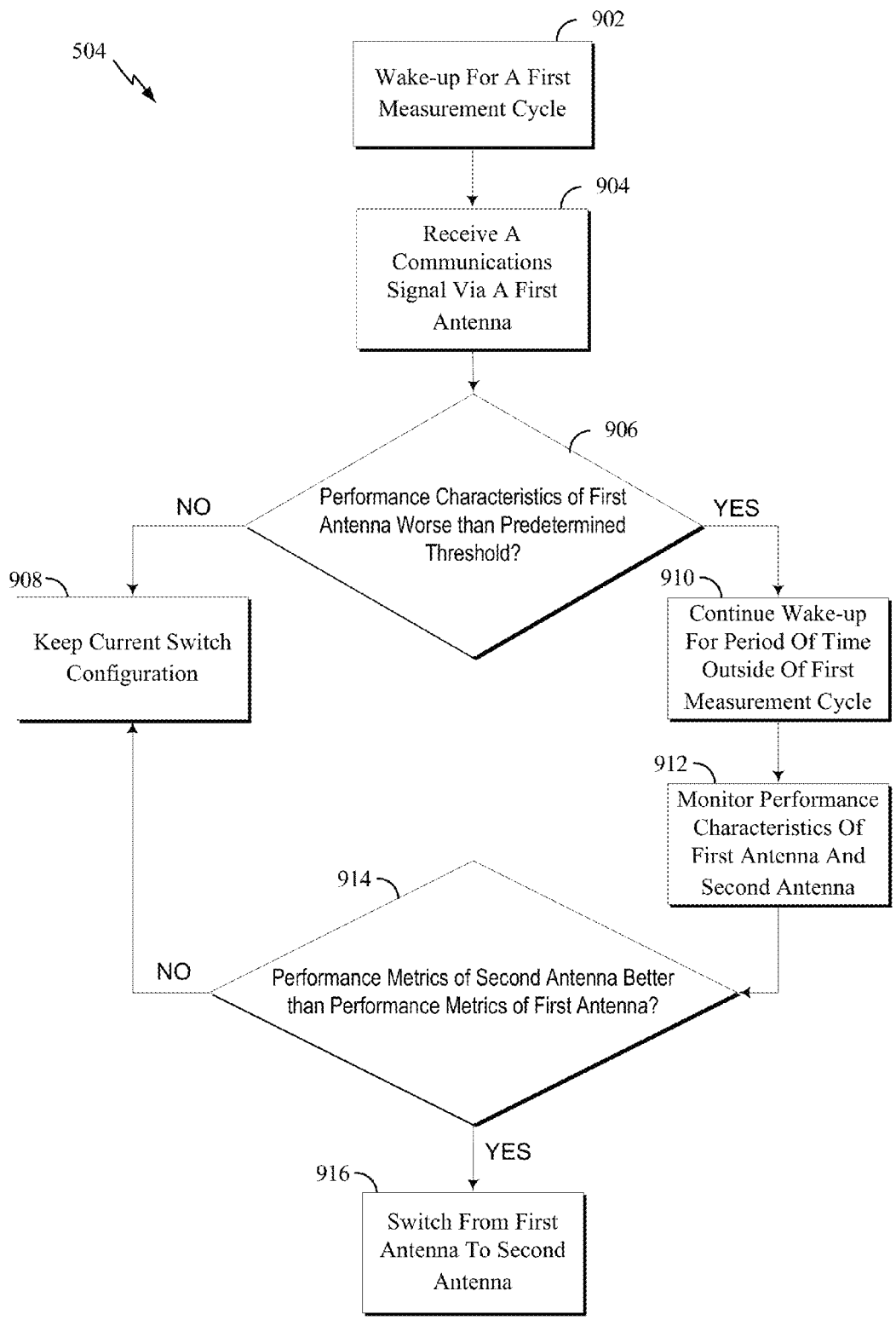
FIG. 9 is a flowchart of an implementation of another exemplary method implemented by a wireless communication apparatus in accordance with some embodiments in accordance with some embodiments.

FIG. 9 shows a flowchart of an implementation of an exemplary method 504 illustrating another embodiment of block 504 as shown in brackets in FIG. 5. According to the method 504 illustrated in FIG. 7, if the performance characteristics of the first antenna 370a during a first measurement cycle are worse than a predetermined threshold, the receiving circuit 340a, the processor/controller 320, the RAT Module 302a, or a combination thereof may monitor the performance characteristics of both the first antenna 370a and the second antenna 370b for a period of time outside of the first measurement cycle. The processor/controller 320, the RAT Module 302a, or a combination thereof may cause the switching circuit 360 to selectively switch the transmit circuit 330a and the primary receive circuit 340a from transmitting and receiving via the first antenna 370a (bar position) to transmitting and receiving via the second antenna 370b (crossbar position) if the performance characteristics of the second antenna 370b are better than the performance metrics of the first antenna 370a.

For example, at block 902, the access terminal 106 wakes up for a first measurement cycle. In some embodiments, the first measurement cycle may be a predetermined wake-up cycle time according to a wake-up schedule as negotiated with the network. For example, the access terminal 106 may be in an idle state, during which the access terminal 106 may wake-up at the predetermined wake-up time to monitor signaling and/or control channels for messages, such as pages or other overhead information. For example, the access terminal 106 may be scheduled to wake up at a predetermined wake-up cycle every 2.5 seconds for a period of 0.5 seconds in order to receive a page or other message. In some embodiments, the first measurement cycle may be a wake-up cycle time outside of the predetermined wake-up cycle. For example, the access terminal 106 may negotiate a time outside of the predetermined wake-up cycle with the network when the access terminal 106 will wake up to monitor antenna performance.

At block 904, the access terminal 106 receives a communications signal via a first antenna during the first measurement cycle. For example, the first antenna 370a may be connected via the switching circuit 360 to the first receive circuit 340a. The receive circuit 340a, the processor/controller 320, the RAT Module 302a, or a combination thereof may monitor performance of the first antenna 370a during the first measurement cycle. The performance characteristics may include any type of performance characteristic of an antenna, including, but not limited to, receive power level, signal strength, interference level, and the like.

At block 906, the receive circuit 340a, the processor/controller 320, the RAT Module 302a, or a combination thereof may determine whether the performance characteristics of the first antenna 370a are worse than a predetermined threshold. The comparison to the threshold depends on the specific antenna performance characteristic being detected, which may include a power level, a signal strength, an interference level, and the like. For example, if a threshold power level is used, the comparison is based on whether the detected power level is below the threshold power level. As another example, if a threshold interference level is used, the comparison is based on whether the detected interference is above the threshold interference level. At block 908, if the receive circuit 340a, the processor/controller 320, and/or the RAT Module 302a determines that the performance characteristics of the first antenna 370a are not worse than the threshold level during the first measurement cycle, the current position of the switching circuitry 360 is maintained and the transmit circuit 330a and the primary receive circuit 340a continue to use antenna 370a. Accordingly, the secondary receive circuit 340b continues to use antenna 370b.

At block 910, if the receive circuit 340a, the processor/controller 320, and/or the RAT Module 302a determines that the performance characteristics of the first antenna 370a are worse than the threshold level during the first measurement cycle, the receive circuit 340a, the processor/controller 320, and/or the RAT Module 302a causes the access terminal 106 to continue to stay awake for a period of time outside of the first measurement cycle.

At block 912, the performance characteristics of both the first antenna 370a and the second antenna 370b are monitored for the period of time outside of the first measurement cycle. In some embodiments, the first measurement cycle may be a predetermined wake-up cycle according to the network wake-up schedule, and the period of time outside of that wake-up cycle may be an extended period of time for the access terminal 106 to stay awake for monitoring performance characteristics of the second antenna 370b. For example, the access terminal 106 may stay awake for the measurement wake-up period 1008c described above with respect to FIG. 10c. As one example, the access terminal 106 may be scheduled to wake up at a predetermined wake-up cycle every 2.5 seconds for a period of 0.5 seconds in order to receive a page or other message, and the extended period of time outside of that predetermined wake-up cycle may, for example, include an extra 0.5 seconds. The extra time may allow the access terminal 106 to have sufficient time to measure the performance characteristics of the second antenna 370b. In another example, the access terminal 106 may wake up for periods 1008a or 1008b to monitor the performance characteristics of the first antenna 370a and second antenna 370b. In another example, the first measurement cycle may be a wake-up cycle time period other than a predetermined wake-up cycle, and the period of time outside of that wake-up cycle may be an additional period of time outside of the predetermined wake-up cycle so that the access terminal 106 has ample time to monitor the performance characteristics of the second antenna 370b. Those skilled in the art will appreciate that various specific periods of time in addition to the predetermined wake-up cycle times may be used to monitor antenna performance characteristics, such as an extra 0.1, 0.2, 0.3, 0.4, 0.5, 0.6, 0.7, 0.8, 0.9, or 1.0 seconds.

In some embodiments, the receive circuit 340a, the processor/controller 320, and/or the RAT Module 302a may serially monitor the downlink performance metrics of first antenna and the second antenna by monitoring the downlink performance metrics of the first antenna and then monitoring the downlink performance metrics of the second antenna using the same transmit and receive circuits 330a, 340a. For example, the primary receive circuit 340a and the transmit circuit 330a may first monitor the performance characteristics of first antenna 370a during a first period of time outside of the first measurement cycle, such as an additional 0.5 seconds. The transmit and primary receive circuits 330a, 340a may then be switched to the second antenna 370b so that the transmit and primary receive circuits 330a, 340a can be used to detect the performance characteristics of antenna 370b during an additional period of time outside of the first measurement cycle and the first period of time, such as additional 0.5 seconds. As a result, in this example, an additional period of time of 1 second is used to monitor the performance characteristics of the antennas 370a and 370b. Using the transmit and primary receive circuits 330a, 340a to serially monitor the performance of antenna 370a and antenna 370b may allow an accurate indication of the difference in performance between the two antennas prior to a switching decision being ultimately made.

In other embodiments, the performance characteristics of the antennas 370a and 370b may be detected using the transmit and/or receive circuits for which they are initially connected. For example, the primary receive circuit 340a and the transmit circuit 330a may first monitor the performance characteristics of first antenna 370a during a first period of time outside of the first measurement cycle, such as an additional 0.5 seconds. The secondary receive circuit 340b may then be used to monitor the performance characteristics of antenna 370b during an additional period of time outside of the first measurement cycle and the first period of time, such as additional 0.5 seconds. Using the original switch configuration to monitor the antenna performance for both antennas 370a and 370b may allow a faster decision to be made regarding whether to ultimately switch antennas and, in turn, may conserve batter power.

At block 914, the receive circuit 340*a*, the processor/controller 320, the RAT Module 302*a*, or a combination thereof may determine whether the performance characteristics of the second antenna 370*b* are better than the performance metrics of the first antenna 370*a*. At block 916, if the receive circuit 340*a*, the processor/controller 320, and/or the RAT Module 302*a* determines that the performance characteristics of the second antenna 370*b* are better than the performance metrics of the first antenna 370*a*, the processor/controller 320, the RAT Module 302*a*, or a combination thereof may cause the switching circuit 360 to switch to a crossbar position so that the transmit circuit 330*a* and the primary receiving circuit 340*a* are switched from antenna 370*a* to antenna 370*b*. Accordingly, secondary receiving antenna 340*b* is switched from antenna 370*b* to antenna 370*a*. In the event the switch has already been configured in a crossbar position so that the transmit circuit 330*a* and the primary receiving circuit 340*a* are connected to the antenna 370*b* to monitor the performance characteristics of the antenna 370*b* in block 912, the switching circuitry 360 may maintain the crossbar configuration at block 916.

If the receive circuit 340*a*, the processor/controller 320, and/or the RAT Module 302*a* determines that the performance characteristics of the second antenna 370*b* are not better than the first antenna 370*a*, the method may return to block 908, and the current switching circuitry 360 position is maintained so that the transmit circuit 330*a* and the primary receive circuit 340*a* continue to use antenna 370*a*. In the event the switch has previously been configured in a crossbar position so that the transmit circuit 330*a* and the primary receiving circuit 340*a* are connected to the antenna 370*b* to monitor the performance characteristics of the antenna 370*b* in step 912, the switching circuitry 360 may change the configuration back to a bar position at block 908.

In some embodiments, receive circuit 340*a*, the processor/controller 320, the RAT Module 302*a*, or a combination thereof may determine whether the difference between the performance characteristics of antennas 370*a* and 370*b* is greater than a threshold difference, which may be provided to ensure that switching is not done unnecessarily. For example, it may only be necessary to switch the transmit circuit 330*a* and receive circuit 340*a* from antenna 370*a* to antenna 370*b* if the difference in performance characteristics between the two antennas is large enough. For example, if a receive power level is used as the performance characteristic, the switch may occur only if the difference between the power levels of the two antennas is greater than 10 dB. The threshold difference may depend on a variety of factors for an imbalance in performance characteristics, as described above.

Accordingly, the receiving circuit 340*a* may be switched from the first antenna 370*a* to the second antenna 370*b* after measuring the performance characteristics of the first antenna 370*a* and the second antenna 370*b* during an extended period of time relative to a normal wake-up cycle period. The method illustrated in FIG. 9 thus allows the performance characteristics of the first antenna 370*a* and the second antenna 370*b* to be determined for a sufficient period of time and compared prior to determining whether to switch the receiving circuit 340*a* from the first antenna 370*a* to the second antenna 370*b*. While potentially consuming more battery power than the methods illustrated in FIG. 6, 7, and/or 8, the method of FIG. 9 ensures that the access terminal 106 determines that the switching decision is necessary by taking into account actual conditions that will likely occur if the ultimate decision to switch antennas is made.

In each of the above examples, after the first receive circuit 340*a* and transmit circuit 330*a* has been switched to the second antenna 370*b*, the receive circuit 340*a*, the processor/controller 320, and/or the RAT Module 302*a* may monitor the performance characteristics of the first antenna 370*a* and/or the second antenna 370*b* during one or more additional measurement cycles, such as measurement periods or cycles 1008*a*, 1008*b*, or 1008*c*. If the performance characteristics of the second antenna 370*b* are worse than a predetermined threshold compared to the original antenna 370*a*, or are worse than the performance characteristics of antenna 370*a*, the processor/controller 320 and/or the RAT Module 302*a* may cause the switching circuit 360 to switch the receiver circuit 340*a* and the transmit circuit 330*a* back to the first antenna 370*a*. The methods of FIGS. 6-9 may be used to determine whether to switch back from the antenna 370*b* to the antenna 370*a*.

Those skilled in the art will appreciate that the access terminal 106 may wake up at different times, such as, for example, every 1, 1.5, 2, 2.5, 3, 3.5, or 4 seconds, depending on the particular scenario and power saving constraints. Those skilled in the art will further appreciate that that various durations of time for each wake-up cycles and/or for each additional period of time outside of the wake-up cycles may be used to monitor antenna performance characteristics, such as 0.1, 0.2, 0.3, 0.4, 0.5, 0.6, 0.7, 0.8, 0.9, or 1.0 seconds.

It should be appreciated that the principles described above with reference to FIGS. 4-10*c* may be applied similarly where the number of transmit and receive circuits, as well as antennas, is greater than or less than the number described herein. Accordingly, the processor/controller 320, the RAT Module 302*a*, or a combination thereof may be configured to switch multiple transmit circuits 330*a*, 330*b*, and 330*n* and/or receive circuits 340*a*, 340*b*, and 340*n* based on the performance characteristics of various antennas 370*a*, 370*b*, and 370*n*.

Figure 11:
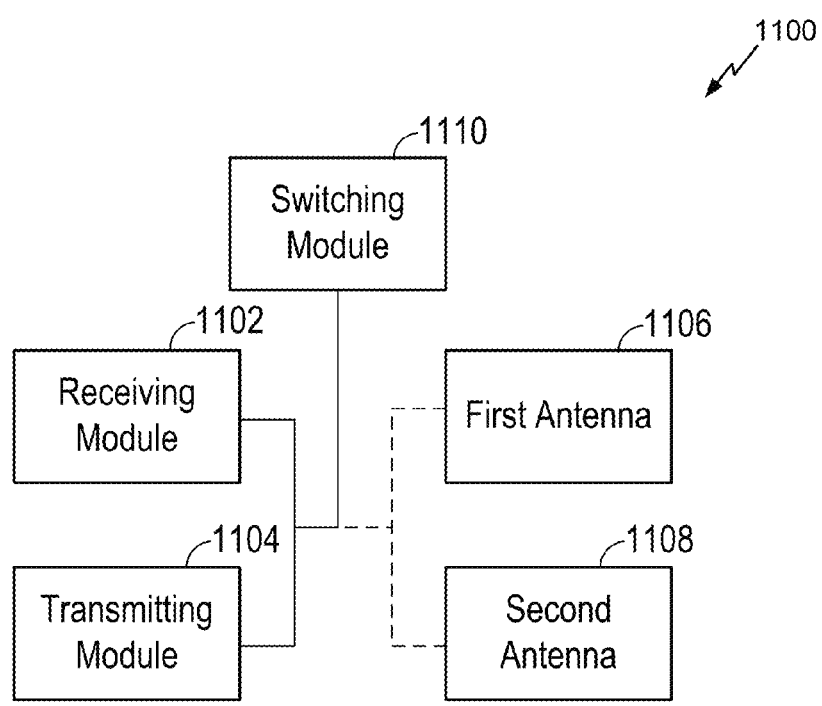
FIG. 11 is a functional block diagram of another exemplary wireless communication apparatus that may be employed within the wireless communication system in accordance with some embodiments.

FIG. 11 is a functional block diagram of an exemplary wireless communication apparatus 1100 that may be employed within the wireless communication system 110 in accordance with some embodiments. Those skilled in the art will appreciate that a wireless communication device 1100 may have more components, such as any one or more of the components shown in FIGS. 3 and/or 4. The wireless communication device 1100 shown includes only those components useful for describing some prominent features of certain embodiments.

The device 1100 includes a receiving module 1102. In some cases, a means for receiving may include the receiving module 1102. In some embodiments, the receiving module 1102 may include a single receive circuit or a plurality of receive circuits including the first receive circuit. For example, the receive circuit or the plurality of receive circuits may include one or more of receive circuits 340*a*, 340*b*, and 340*n*. The receiving module 1102 may be configured to perform one or more of the functions described above with respect to block 502 of FIG. 5. For example, the receiving module 1102 may be configured to receive wireless communications at a first receive circuit via a first antenna.

The device 1100 further includes a transmitting module 1104. In some cases, a means for transmitting may include a transmitting module 1104. In some embodiments, the transmitting module 1104 may include a plurality of transmit circuits, such as transmit circuits 330*a*, 330*b*, and 330*n*. The device 1100 further includes a first antenna 1106 and a second antenna 1108. For example, the first antenna 1106 and the second antenna 1108 may include antennas 370a and 370b, respectively.

The device 1100 further includes a switching module 1110. The switching module 1110 may be configured to perform one or more of the functions described above with respect to block 504 as illustrated in FIGS. 5-9. As one example, the switching module 1110 may be configured to selectively switch the first receive circuit from receiving wireless communications via the first antenna to receive wireless communications via a second antenna if one or more performance characteristics of the first antenna are below a threshold in one or more measurement cycles. In some cases, a means for switching and/or a means for selectively switching may include the switching module 1110 and may be configured to perform one or more of the functions described above with respect to block 504 illustrated in FIGS. 5-9. The switching module 1110 may include the processor/controller 320, the RAT Module 302a, and/or the switching circuitry 360.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 12:
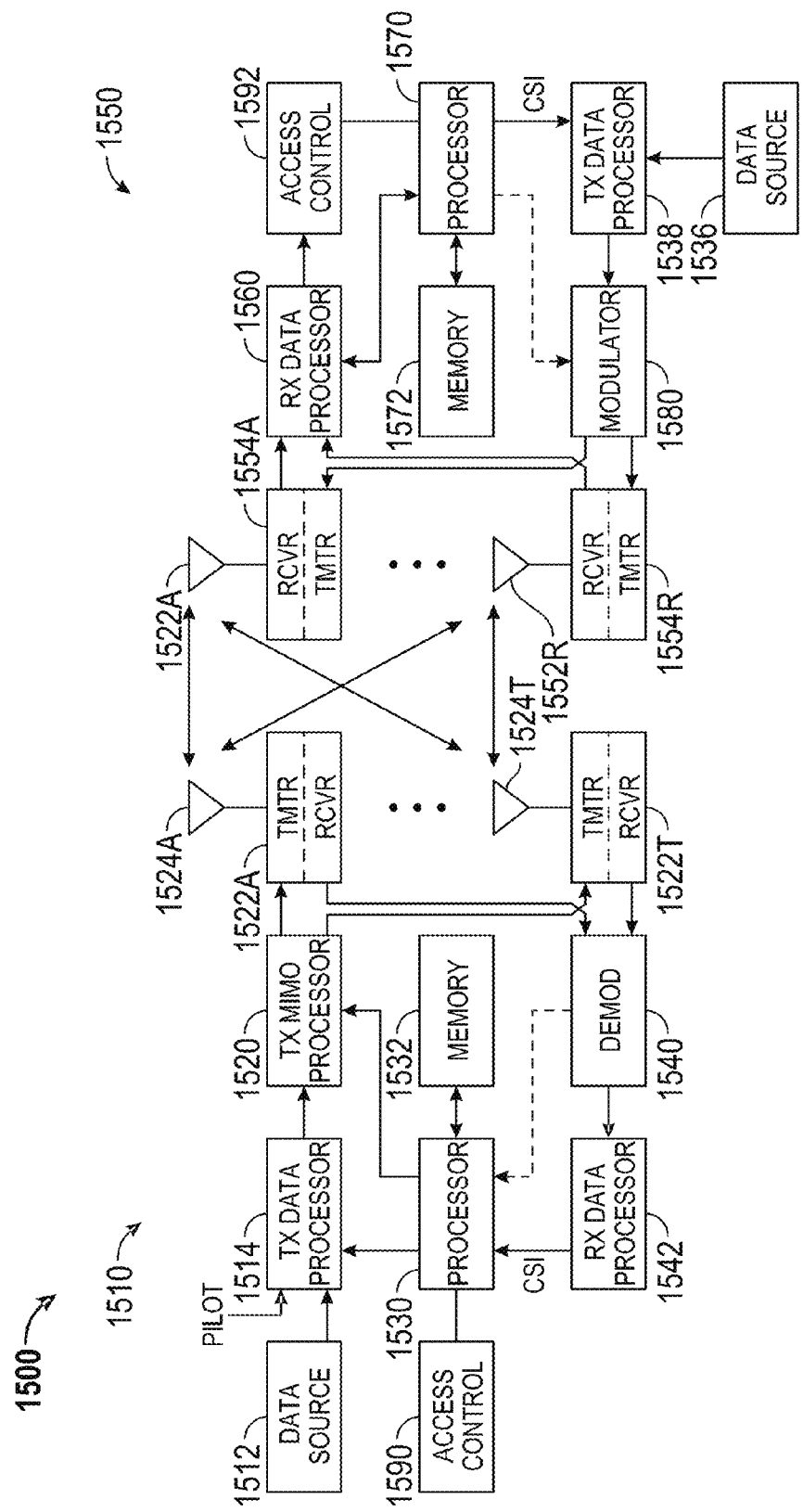
FIG. 12 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 12 depicts several sample components that may be employed to facilitate communication between nodes in accordance with some embodiments. Specifically, FIG. 12 is a simplified block diagram of a first wireless device 1510 (e.g., an access point) and a second wireless device 1550 (e.g., an access terminal) of a multiple-in-multiple-out (MIMO) system 1500. At the first device 1510, traffic data for a number of data streams is provided from a data source 1512 to a transmit (TX) data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the second device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and down converts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which precoding matrix to use (discussed below). The processor 1570 formulates a reverse link message comprising a matrix index portion and a rank value portion. A data memory 1572 may store program code, data, and other information used by the processor 1570 or other components of the second device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the second device 1550 are received by the antennas 1524, conditioned by the transceivers 1522, demodulated by a demodulator (DEMOD) 1540, and processed by a RX data processor 1542 to extract the reverse link message transmitted by the second device 1550. The processor 1530 then determines which pre-coding matrix to use for determining the beam-forming weights then processes the extracted message.

FIG. 12 also illustrates that the communication components may include one or more components that perform access control operations as taught herein. For example, an access control component 1590 may cooperate with the processor 1530 and/or other components of the device 1510 to send/receive signals to/from another device (e.g., device 1550) as taught herein. Similarly, an access control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the access control component 1590 and the processor 1530 and a single processing component may provide the functionality of the access control component 1592 and the processor 1570. Furthermore, the components of the apparatus 1500 described with reference to FIG. 3 may be incorporated with/into the components of FIG. 12.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communication apparatus, comprising:
a plurality of antennas including a first antenna and a second antenna;
at least one receive circuit including a first receive circuit; and
a controller configured to:
during a plurality of predetermined wake-up periods, receive a page channel via the first antenna, wherein the plurality of predetermined wake up periods are negotiated with a network for waking the apparatus from a sleep period according to a predetermined wake-up cycle;
wake up from the sleep period during a measurement period, to monitor one or more performance characteristics of the first antenna, wherein the measurement period comprises a period of time occurring outside of the plurality of predetermined wake-up periods; and
selectively switch to receive the page channel via the second antenna based on the one or more performance characteristics of the first antenna.

2. The wireless communication apparatus of claim 1, wherein the one or more performance characteristics of the first antenna include one or more downlink performance metrics.

3. The wireless communication apparatus of claim 2, wherein the measurement period occurs immediately prior to one of the predetermined wake-up periods.

4. The wireless communication apparatus of claim 2, wherein the controller is further configured to selectively switch if the one or more downlink performance metrics of the first antenna are below a threshold during the measurement period.

5. The wireless communication apparatus of claim 2, wherein the controller is further configured to:
monitor the one or more downlink performance metrics of the first antenna during the measurement period according to a comparison of the one or more downlink performance metrics to a threshold during a different measurement period; and
selectively switch based on the comparison.

6. The wireless communication apparatus of claim 2, wherein the controller is further configured to:
monitor one or more downlink performance metrics of the second antenna during the measurement period;
compare the one or more downlink performance metrics of the first antenna to the one or more downlink performance metrics of the second antenna; and
selectively switch based on the comparison.

7. The wireless communication apparatus of claim 2, wherein the controller is further configured to:
monitor the one or more downlink performance metrics of the first antenna and one or more downlink performance metrics of the second antenna during the measurement period;
compare the one or more downlink performance metrics of the first antenna and the second antenna; and
selectively switch based on the comparison.

8. The wireless communication apparatus of claim 7, wherein the controller is further configured to serially monitor the one or more downlink performance metrics of the first antenna and the second antenna, the serial monitoring including:
monitoring the one or more downlink performance metrics of the first antenna using the first receive circuit; and
monitoring the one or more downlink performance metrics of the second antenna using the first receive circuit after the monitoring the one or more downlink performance metrics of the first antenna.

9. The wireless communication apparatus of claim 2, wherein the controller is further configured to selectively switch back from the second antenna to the first antenna if one or more downlink performance metrics of the second antenna in a different measurement period are lower than the one or more downlink performance metrics of the first antenna during the different measurement period.

10. A method implemented in a wireless communication apparatus, the method comprising:
receiving wireless communications at a first receive circuit via a first antenna;
during a plurality of predetermined wake-up periods, receiving a page channel via the first antenna, wherein the plurality of predetermined wake-up periods are negotiated with a network for waking the apparatus from a sleep period according to a predetermined wake-up cycle;
waking up from the sleep period during a measurement period, to monitor one or more performance characteristics of the first antenna, wherein the measurement period comprises a period of time occurring outside of the plurality of predetermined wake-up periods; and
selectively switching to receive the page channel via a second antenna based on the one or more performance characteristics of the first antenna.

11. The method of claim 10, wherein the one or more performance characteristics of the first antenna include one or more downlink performance metrics.

12. The method of claim 11, wherein the measurement period occurs immediately prior to one of the predetermined wake-up periods.

13. The method of claim 11, further comprising selectively switching if the one or more downlink performance metrics of the first antenna are below a threshold during the measurement period.

14. The method of claim 11, further comprising:
monitoring the one or more downlink performance metrics of the first antenna during the measurement period according to a comparison of the one or more downlink performance metrics to a threshold during a different measurement period; and
selectively switching based on the comparison.

15. The method of claim 11, further comprising:
monitoring one or more downlink performance metrics of the second antenna during the measurement period; and comparing the one or more downlink performance metrics of the first antenna to the one or more downlink performance metrics of the second antenna; and
selectively switching based on the comparison.

16. The method of claim 11, further comprising:
monitoring the one or more downlink performance metrics of the first antenna and one or more downlink performance metrics of the second antenna during the measurement period;
comparing the one or more downlink performance metrics of the first antenna and the second antenna; and
selectively switching based on the comparison.

17. The method of claim 16, further comprising serially monitoring the one or more downlink performance metrics of the first antenna and the second antenna, the serially monitoring including:
monitoring the one or more downlink performance metrics of the first antenna using the first receive circuit; and
monitoring the one or more downlink performance metrics of the second antenna using the first receive circuit after the monitoring the one or more downlink performance metrics of the first antenna.

18. The method of claim 11, further comprising selectively switching back from the second antenna to the first antenna if one or more downlink performance metrics of the second antenna in a different measurement period-are lower than the one or more downlink performance metrics of the first antenna during the different measurement period.

19. A wireless communication apparatus, comprising:
a plurality of antennas including a first antenna and a second antenna;
at least one receive circuit including a first receive circuit; and
means for selectively switching configured to:
during a plurality of predetermined wake-up periods, receive a page channel via the first antenna, wherein the plurality of predetermined wake-up periods are negotiated with a network for waking the apparatus from a sleep period according to a predetermined wake-up cycle;
wake up from the sleep period during a measurement period, to monitor one or more performance characteristics of the first antenna, wherein the measurement period comprises a period of time occurring outside of the plurality of predetermined wake-up periods; and
selectively switch to receive the page channel via the second antenna based on the one or more performance characteristics of the first antenna.

20. The wireless communication apparatus of claim 19, wherein the one or more performance characteristics of the first antenna include one or more downlink performance metrics.

21. The wireless communication apparatus of claim 20, wherein the measurement period occurs immediately prior to one of the predetermined wake-up periods.

22. The wireless communication apparatus of claim 20, wherein the means for selectively switching is further configured to selectively switch if the one or more downlink performance metrics of the first antenna are below a threshold during the measurement period.

23. The wireless communication apparatus of claim 20, wherein the means for selectively switching is further configured to:
monitor the one or more downlink performance metrics of the first antenna during the measurement period according to a comparison of the one or more downlink performance metrics to a threshold during a different measurement period; and
selectively switch based on the comparison.

24. The wireless communication apparatus of claim 20, wherein the means for selectively switching is further configured to:
monitor one or more downlink performance metrics of the second antenna during the measurement period;
compare the one or more downlink performance metrics of the first antenna to the one or more downlink performance metrics of the second antenna; and
selectively switch based on the comparison.

25. The wireless communication apparatus of claim 20, wherein the means for selectively switching is further configured to:
monitor the one or more downlink performance metrics of the first antenna and one or more downlink performance metrics of the second antenna during the measurement period;
compare the one or more downlink performance metrics of the first antenna and the second antenna; and
selectively switch based on the comparison.

26. The wireless communication apparatus of claim 25, wherein the means for selectively switching is further configured to serially monitor the one or more downlink performance metrics of the first antenna and the second antenna, the serially monitoring including:
monitoring the one or more downlink performance metrics of the first antenna using the first receive circuit; and
monitoring the one or more downlink performance metrics of the second antenna using the first receive circuit after the monitoring the one or more downlink performance metrics of the first antenna.

27. The wireless communication apparatus of claim 20, wherein the means for selectively switching is further configured to selectively switch back from the second antenna to the first antenna if one or more downlink performance metrics of the second antenna in a different measurement period are lower than the one or more downlink performance metrics of the first antenna during the different measurement period.

28. A non-transitory computer-readable medium comprising:
code, when executed by a computer, causing the computer to receive wireless communications at a first receive circuit via a first antenna;
code, when executed by the computer, causing the computer during a plurality of predetermined wake-up periods, to receive a page channel via the first antenna, wherein the plurality of predetermined wake-up periods are negotiated with a network for waking the computer from a sleep period according to a predetermined wake-up cycle;
code, when executed by the computer, causing the computer to wake up from the sleep period during a measurement period, to monitor one or more performance characteristics of the first antenna, wherein the measurement period comprises a period of time occurring outside of the plurality of predetermined wake-up periods; and
code, when executed by the computer, causing the computer to selectively switch to receive the page channel via a second antenna based on the one or more performance characteristics of the first antenna.

29. The non-transitory computer-readable medium of claim 28, wherein the one or more performance characteristics of the first antenna include one or more downlink performance metrics.

30. The non-transitory computer-readable medium of claim 29, wherein the measurement period occurs immediately prior to one of the predetermined wake-up periods.

31. The non-transitory computer-readable medium of claim 29, further comprising code, when executed by the computer, causing the computer to selectively switch if the one or more downlink performance metrics of the first antenna are below a threshold during the measurement period.

32. The non-transitory computer-readable medium of claim 29, further comprising code, when executed by the computer, causing the computer to:
    monitor the one or more downlink performance metrics of the first antenna during the measurement period according to a comparison of the one or more downlink performance metrics to a threshold during a different measurement period; and
    selectively switch based on the comparison.

33. The non-transitory computer-readable medium of claim 29, further comprising code, when executed by the computer, causing the computer to:
    monitor one or more downlink performance metrics of the second antenna during the measurement period; and
    compare the one or more downlink performance metrics of the first antenna to the one or more downlink performance metrics of the second antenna; and
    selectively switch based on the comparison.

34. The non-transitory computer-readable medium of claim 29, further comprising code, when executed by the computer, causing the computer to:
    monitor the one or more downlink performance metrics of the first antenna and one or more downlink performance metrics of the second antenna during the measurement period;
    compare the one or more downlink performance metrics of the first antenna and the second antenna; and
    selectively switch based on the comparison.

35. The non-transitory computer-readable medium of claim 34, further comprising code, when executed by the computer, causing the computer to serially monitor the one or more downlink performance metrics of the first antenna and the second antenna, the serially monitoring including:
    monitoring the one or more downlink performance metrics of the first antenna using the first receive circuit; and
    monitoring the one or more downlink performance metrics of the second antenna using the first receive circuit after the monitoring the one or more downlink performance metrics of the first antenna.

36. The non-transitory computer-readable medium of claim 29, further comprising code, when executed by the computer, causing the computer to selectively switch back from the second antenna to the first antenna if one or more downlink performance metrics of the second antenna in a different measurement period are lower than the one or more downlink performance metrics of the first antenna during the different measurement period.

* * * * *